US012598660B2

(12) United States Patent
Liu et al.

(10) Patent No.: US 12,598,660 B2
(45) Date of Patent: Apr. 7, 2026

(54) METHOD FOR SELECTING RELAY DEVICE, REMOTE DEVICE AND RELAY DEVICE

(71) Applicant: GUANGDONG OPPO MOBILE TELECOMMUNICATIONS CORP., LTD., Dongguan (CN)

(72) Inventors: Jianhua Liu, Dongguan (CN); Yali Guo, Dongguan (CN); Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 643 days.

(21) Appl. No.: 18/145,845

(22) Filed: Dec. 22, 2022

(65) Prior Publication Data

US 2023/0126582 A1     Apr. 27, 2023

Related U.S. Application Data

(63) Continuation of application No. PCT/CN2020/118967, filed on Sep. 29, 2020.

(51) Int. Cl.
*H04W 4/00*        (2018.01)
*H04W 8/00*        (2009.01)
(Continued)

(52) U.S. Cl.
CPC ........... *H04W 76/14* (2018.02); *H04W 8/005* (2013.01); *H04W 88/04* (2013.01)

(58) Field of Classification Search
CPC ..... H04W 76/14; H04W 8/005; H04W 88/04; H04W 8/00
(Continued)

(56) References Cited

U.S. PATENT DOCUMENTS 8,837,443 B2 *   9/2014  Yamada ................ H04W 28/10
                                                    370/338
9,826,460 B2 *  11/2017  Patil ...................... H04W 76/14
               (Continued)

FOREIGN PATENT DOCUMENTS

CN          106304257 A       1/2017
CN          106888494 A       6/2017
               (Continued)

OTHER PUBLICATIONS

International Search Report in the international application No. PCT/CN2020/118967, mailed on Jun. 2, 2021.
(Continued)

*Primary Examiner* — Marceau Milord
(74) *Attorney, Agent, or Firm* — Ladas & Parry, LLP

(57)                ABSTRACT

Provided are a method for selecting a relay device, a remote device and a relay device. The method includes: a relay device sending a first message to a remote device, herein the first message is used for indicating a relay mode which can be provided by the relay device; and the remote device selecting a first relay device from among at least one relay device on the basis of a relay mode to which the remote device can adapt, and a relay mode which can be provided by the at least one relay device, herein the first relay device is used for realizing communication between the remote device and a network device, and the relay mode which can be provided by the first relay device matches the relay mode to which the remote device can adapt.

18 Claims, 21 Drawing Sheets

(51) Int. Cl.
　　*H04W 76/14*　　　(2018.01)
　　*H04W 88/04*　　　(2009.01)

(58) Field of Classification Search
　　USPC ........................................................ 370/329
　　See application file for complete search history.

(56) References Cited

U.S. PATENT DOCUMENTS

| | | | | |
|---|---|---|---|---|
| 9,955,334 | B2 * | 4/2018 | Chen | H04W 8/00 |
| 10,292,087 | B2 * | 5/2019 | Tenny | H04W 48/02 |
| 10,341,009 | B2 | 7/2019 | Hwang | |
| 10,708,754 | B2 | 7/2020 | Xu | |
| 10,932,175 | B2 * | 2/2021 | Kim | H04W 36/22 |
| 2012/0039171 | A1 * | 2/2012 | Yamada | H04W 72/52 |
| | | | | 370/232 |
| 2015/0029866 | A1 * | 1/2015 | Liao | H04W 48/14 |
| | | | | 370/254 |
| 2015/0333813 | A1 * | 11/2015 | Liu | H04B 7/0413 |
| | | | | 370/329 |
| 2016/0337935 | A1 * | 11/2016 | Patil | H04W 72/27 |
| 2017/0359116 | A1 | 12/2017 | Hwang et al. | |
| 2018/0192258 | A1 * | 7/2018 | Vempati | H04W 4/10 |
| 2018/0220356 | A1 * | 8/2018 | Tenny | H04B 7/15507 |
| 2018/0279195 | A1 * | 9/2018 | Kim | H04W 36/22 |
| 2018/0317163 | A1 * | 11/2018 | Lee | H04W 4/70 |
| 2019/0253869 | A1 | 8/2019 | Xu et al. | |
| 2019/0326979 | A1 | 10/2019 | Hwang et al. | |
| 2019/0350047 | A1 | 11/2019 | Shan et al. | |
| 2019/0357284 | A1 | 11/2019 | Xu et al. | |

FOREIGN PATENT DOCUMENTS

| | | |
|---|---|---|
| CN | 108809897 A | 11/2018 |
| CN | 109246793 A | 1/2019 |
| CN | 109691149 A | 4/2019 |
| CN | 110098858 A | 8/2019 |
| CN | 110099423 A | 8/2019 |
| EP | 3522578 A1 | 8/2019 |
| EP | 3618391 A1 | 3/2020 |

OTHER PUBLICATIONS

Written Opinion of the International Search Authority in the international application No. PCT/CN2020/118967, mailed on Jun. 2, 2021.

First Office Action of the corresponding European application No. 20955565.5, issued on Dec. 6, 2023.

"3rd Generation Partnership Project; Technical Specification Group Services and System Aspects; Study on system enhancement for Proximity based Services (ProSe) in the 5G System (5GS) (Release 17)", 3GPP TR 23.752 V0.4.0 (Jun. 2020), pp. 84-86.

Second Office Action issued on Sep. 25, 2024 for the Chinese Patent application No. 202310183158.6 and its English translation provided by Applicant's Foreign Counsel.

Second Office Action issued on Jun. 25, 2024 for European Patent Application No. 20955565.5.

First Office Action issued on Jun. 28, 2024 for Chinese Patent Application No. 202310183158.6 and its English translation provided by Applicant's foreign counsel.

Decision of Rejection of the Chinese patent application No. 202310183158.6, issued on Dec. 24, 2024.

3GPP TR 23.733 V15.1.0 (Dec. 2017), 3rd Generation Partnership Project; Technical Specification Group Services and System Aspects; Study on Architecture Enhancements to ProSe UE-to-Network Relay, (Release 15), Dec. 2017, all pages.

Supplementary European Search Report in the corresponding European application No. 20955565.5, mailed on Apr. 11, 2023.

* cited by examiner

1700

1900

1

METHOD FOR SELECTING RELAY DEVICE, REMOTE DEVICE AND RELAY DEVICE

CROSS-REFERENCE TO RELATED APPLICATION

The present application is a continuation of International Application No. PCT/CN2020/118967 filed on Sep. 29, 2020, the disclosure of which is hereby incorporated by reference in its entirety.

BACKGROUND

A 3rd Generation Partnership Project (3GPP) introduces the concept of relay communication in a Release 13 (R13) Proximity Service (ProSe) architecture.

Relay communication refers to User Equipment (UE)-to-Network based on an Internet Protocol (IP) layer relay. That is to say, a Remote UE is accessed to a network by means of a Relay UE. The Relay UE assumes a function of the IP layer relay, to transmit data between the Remote UE and the network, so as to establish a communication connection between the Remote UE and the network. Exemplarily, an access network device and a core network device are included in the network. The Relay UE sends data from the Remote UE to the access network device, and may further send the data to the core network device from the access network device. Alternatively, the access network device sends data from the core network device to the Relay UE, and then the Relay UE sends data from the access network device to the Remote UE.

Therefore, before the Remote UE transmits data with the network, it is required to first determine a relay device used. Further discussion and research are needed on how to determine the relay device used.

SUMMARY

Embodiments of the present application relate to a field of communication technologies, and in particular, to a method for selecting a relay device, a remote device and a relay device.

A technical solution includes as follows.

In an aspect, an embodiment of the present application provides a method for selecting a relay device. The method is applied to a remote device and includes the following operation.

A first relay device is selected from among at least one relay device on the basis of at least one relay mode to which the remote device can adapt and at least one relay mode which can be provided by the at least one relay device.

The first relay device is used for implementing a communication between the remote device and a network device. At least one relay mode which can be provided by the first relay device matches the at least one relay mode to which the remote device can adapt.

In another aspect, an embodiment of the present application provides a method for selecting a relay device. The method is applied to a relay device and includes the following operation.

A first message is sent to a remote device. The first message is used to indicate at least one relay mode which can be provided by the relay device.

The first message is a discovery message or a response message for a relay solicitation message sent by the remote device.

In still another aspect, an embodiment of the present application provides a remote device. The remote device includes a processor; and a transceiver connected to the processor. The processor is configured to select a first relay device from among at least one relay device on a basis of at least one relay mode to which the remote device is able to adapt and at least one relay mode which is able to be provided by the at least one relay device. The first relay device is used for implementing a communication between the remote device and a network device, and at least one relay mode which is able to be provided by the first relay device matches the at least one relay mode to which the remote device is able to adapt.

In yet another aspect, an embodiment of the present application provides a relay device. The relay device includes a processor; and a transceiver connected to the processor. The transceiver is configured to send a first message to a remote device. The first message is used to indicate at least one relay mode which is able to be provided by the relay device, and the first message is a discovery message or a response message for a relay solicitation message sent by the remote device.

BRIEF DESCRIPTION OF THE DRAWINGS

In order to describe the technical solutions in embodiments of the present application more clearly, the drawings required to be used in the embodiments will be simply introduced below. It is apparent that the drawings in the following descriptions are only some embodiments of the present application. Those of ordinary skill in the art may further obtain other drawings according to these drawings without creative work.

DETAILED DESCRIPTION

Figure 1:
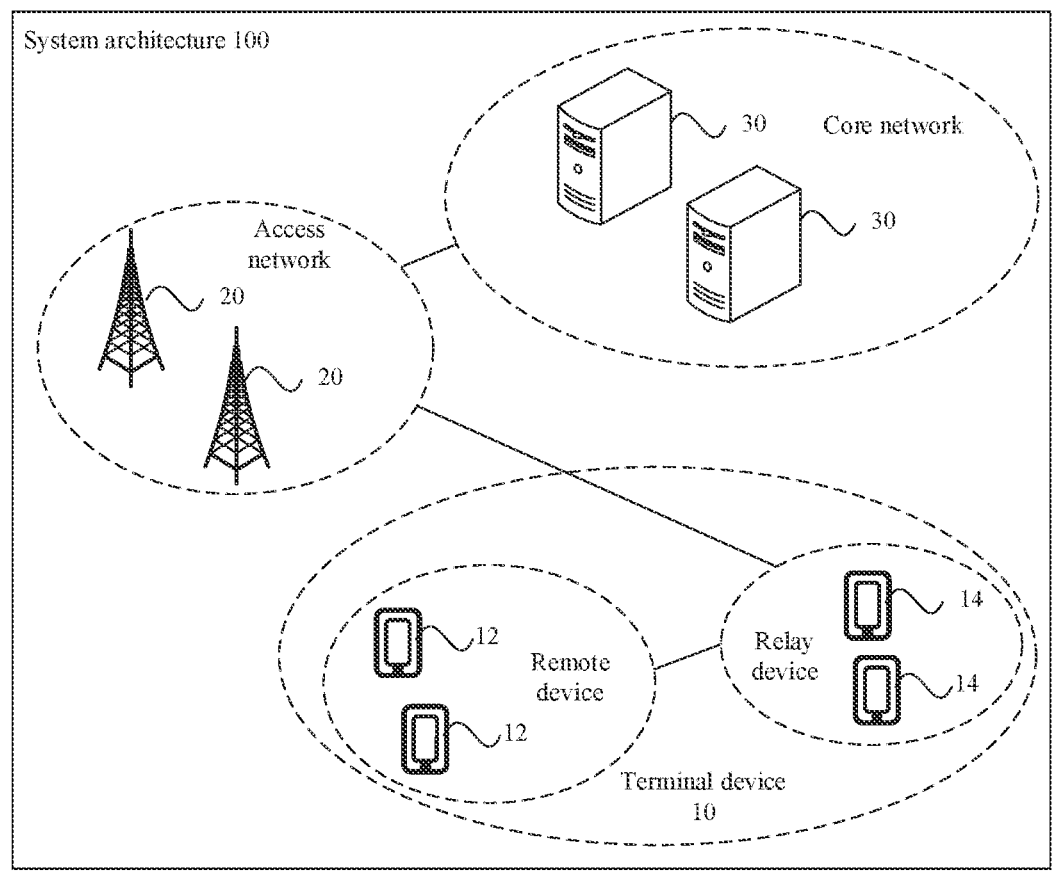
FIG. 1 is a schematic diagram of a communication system according to an embodiment of the present application.

In order to make objectives, technical solutions, and advantages of the present application clearer, the implementations of the present application will be described in detail below with reference to the drawings.

The network architecture and service scenarios described in the embodiments of the present application are for the purpose of describing the technical solutions of the embodiments of the present application more clearly, and do not constitute a limitation on the technical solutions provided in the embodiments of the present application. Those of ordinary skill in the art may learn that, with the evolution of the network architecture and the emergence of new service scenarios, the technical solutions provided in the embodiments of the present application are also applicable to similar technical problems.

The technical solutions provided in the embodiments of the present application may be applied to various communication systems, for example, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a Frequency Division Duplex (FDD, LTE FDD) system, a Time Division Duplex (TDD, LTE TDD) system, a Universal Mobile Telecommunication System (UMTS), a Worldwide Interoperability for Microwave Access (WiMAX) communication system, a 5th-Generation System (5GS) or a New Radio (NR) system, or other evolution systems in the further.

With the continuous development of 5G applications, Network Controlled Interactive Services (NCIS) are introduced into the standard as a new service form, so as to perform related standardized services.

NCIS are mainly used for applications such as Augmented Reality (AR)/Virtual Reality (VR), games and the like, and have high requirements for service quality such as rate, delay, packet loss rate, and high-speed coding and decoding. For example, for a VR game, the rate is required to reach 10

Gbps (switched bandwidth), and the packet loss rate cannot exceed 10 E-4. A session established for the NCIS is an NCIS session. UEs in the same NCIS session may be considered to form an NCIS group, for example, team up in a game. In an example, the UEs in the NCIS group have the following possible communication modes, and may be used in combination.

(1) The UEs are close to each other. For example, a Device-to-Device (D2D) Communication technology is used for broadcast or multicast; or a Sidelink is established, also known as using a PC5 interface, for One-2-One communication (unicast).

(2) The UEs are away from each other. For example, UE-Network-Server-Opposite end Network-Opposite end UE is used (also known as using a Uu interface).

Optionally, the UEs in a group may be from the same Public Land Mobile Network (PLMN), or may be from different PLMNs. For example, there are 5 UEs in an NCIS group, of which 3 are UEs in PLMN 1 and 2 are UEs in PLMN 2. The 3 UEs in PLMN 1 may communicate directly with each other at a PC5 interface by using the D2D technology, and communicate with the 2 UEs in PLMN 2 by using a network.

In an example, an implementation of the NCIS is that the UEs communicate with the network by means of a Relay UE.

FIG. 1 is a schematic diagram of a system architecture of a communication system according to an embodiment of the present application. As shown in FIG. 1, the system architecture 100 may include a terminal device 10, an access network device 20 and a core network device 30.

The terminal device 10 may be a UE, an access terminal, a subscriber unit, a subscriber station, a mobile station, a mobile platform, a remote station, a remote terminal, a mobile device, a wireless communication device, a subscriber agent, or a subscriber apparatus. Optionally, the terminal device may further be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle device, a wearable device, a terminal in a 5GS, or a terminal in a future evolved PLMN, and the embodiments of the present application are not limited thereto.

The access network device 20 is a device that is deployed in an access network so as to provide a wireless communication function for the terminal device. The access network device 20 may include various forms of macro base stations, micro base stations, relay stations, access points, and the like. In a system using different wireless access technologies, the names of devices with functions of an access network device may be different. For example, in the 5GS, the device is called gNodeB or gNB. In an Evolved Packet System (EPS), the access network device may be called Evolved NodeB (eNodeB). As a communication technology evolves, the name "access network device" may change. For ease of description, in this embodiment of the present application, the above apparatus that provides the wireless communication function for the terminal device is collectively called the access network device.

The core network device 30 may be a device that may provide functions such as session management, mobility relationship, policy management and security authentication for the terminal device. In this embodiment of the present application, the core network device 30 may include a first core network device and a second core network device. The first core network device is responsible for the access management and mobility management of the terminal device, and the second core network device is responsible for the session management of the terminal device. Exemplarily, in the 5GS, the first core network device may be implemented as a Core Access and Mobility Management Function (AMF), and the second core network device may be implemented as a Session Management Function (SMF). In the EPS, the first core network device may be implemented as a Mobility Management Entity (MME), and the second core network device may be implemented as a Serving Gateway (SGW).

In an example, as shown in FIG. 1, the terminal device includes a remote terminal device 12 and a relay terminal device 14. Data transmission may be performed between the relay device 14 and the remote device 12, so as to establish a communication connection between the remote device 12 and the access network device 20 and the core network device 30. Exemplarily, the relay device 14 sends data from the remote device 12 to the access network device 20, and the access network device 20 may further send the data to the core network device 30. Alternatively, the access network device 20 sends data from the core network device 30 to the relay device 14, and then the relay device 14 sends the data from the access network device 20 to the remote device 12.

Figure 2:
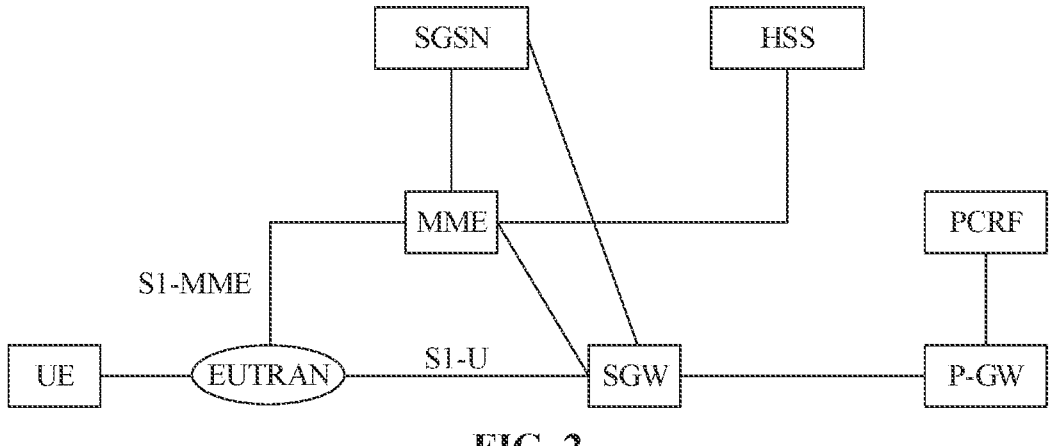
FIG. 2 is a schematic diagram of an EPS architecture according to an embodiment of the present application.

FIG. 2 is a schematic diagram of a system architecture of an EPS according to an embodiment of the present application. As shown in FIG. 2, the system architecture may include the following network entities.

1. EUTRAN: a network composed of a plurality of eNodeBs, which achieves wireless physical layer functions, resource scheduling and wireless resource management, wireless access control and mobility management functions. The eNodeBs may be connected to each other by means of an X2 interface, which may be used to transmit data in an X2-based handover process. The eNodeBs are connected to SGW over a user plane interface SI-U, transmit subscriber data by using a General Packet Radio System General Tunneling Protocol User Plane (GTP-U), are connected to an MME over a control plane interface SI-E, and implement functions such as radio access bearer control by using an SI-AP protocol.

2. MME: mainly responsible for all control plane functions for a subscriber, that is, the session management, including Non-Access-Stratum (NAS) signaling and security, management of Tracking Area List, selection of Packet Data Network Gateway (P-GW) and SGW, and the like.

3. SGW: mainly responsible for the data transmission, forwarding and route switching of the UE, and serving as a local mobility anchor point when the UE switches between the eNodeBs (for each UE, there is only one SGW serving the UE at each moment).

4. P-GW: serving as an anchor point connected to a Packet Data Network (PDN), and responsible for IP address allocation of the UE, and the data message filtering, rate control, and accounting information generation of the UE.

5. Serving GPR Supporting Node (SGSN): an access node of a 2G GSM/EDGE Radio Access Network (GERAN), a 3G Universal Terrestrial Radio Access Network (UTRAN) and an EPS core network EPC, and responsible for the establishment of bearers and data forwarding from GERAN, UTRAN to EPC.

6. Home Subscriber Server (HSS): storing subscription data of a mobile subscriber.

7. Policy and Charging Rules Function (PCRF): responsible for accounting management and policy control, and including a Policy and Charging Control (PCC) rule and a Quality of Service (QoS) rule.

Figure 3:
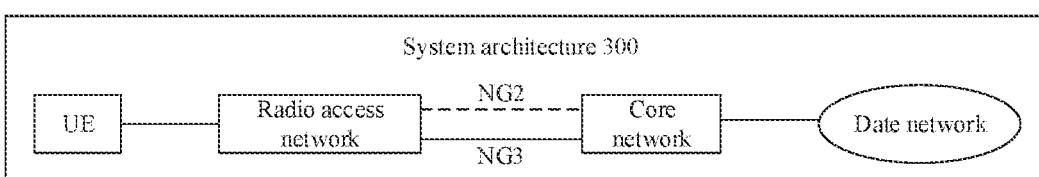
FIG. 3 is a schematic diagram of a 5GS architecture according to an embodiment of the present application.

FIG. 3 is a schematic diagram of a system architecture of a 5GS according to an embodiment of the present application. As shown in FIG. 3, the system architecture 200 may include a UE, a Radio Access Network (RAN), a Core (core network) and a DN. The UE, RAN and Core are main components of the architecture. Logically, the UE, RAN and Core may be divided into a user plane and a control plane. The control plane is responsible for the management of a mobile network, and the user plane is responsible for the transmission of service data. In the figure, an NG2 reference point is located between an RAN control plane and a Core control plane; an NG3 reference point is located between an RAN user plane and a Core user plane; and an NG6 reference point is located between the Core user plane and a data network.

The UE is an inlet that the mobile subscriber interacts with the network, can provide basic computing capabilities and storage capabilities, display a service window to the subscriber, and receive subscriber operation input. The UE uses a next-generation air interface technology to establish a signal connection and a data connection with the RAN, so as to transmit a control signal and service data to the mobile network.

The RAN is similar to a base station in a conventional network, is deployed in a position close to the UE, provides a network access function for an authorized subscriber in a specific area, and can transmit the subscriber data using transmission tunnels with different qualities according to the level of the subscribers and the requirements of services. The RAN can manage and rationally use self-resources to provide an access service for the UE according to requirements, and forward the control signal and the subscriber data between the UE and the core network.

The Core is responsible for maintaining the subscription data of the mobile network, managing network elements of the mobile network, and providing functions such as session management, mobility management, policy management, and security authentication for the UE. When the UE is attached, network access authentication is provided for the UE. When the UE has a service request, a network resource is allocated for the UE. When the UE moves, the network resource is updated for the UE. When the UE is idle, a fast recovery mechanism is provided for the UE. When the UE is detached, the network resource is released for the UE. When the UE has service data, a data routing function is provided for the UE, for example, forwarding uplink data to the DN, or receiving downlink data for UE from the DN and forwarding the data to the RAN, so as to send the data to the UE.

The DN is a data network that provides a service for the subscriber. Generally, a client is located in the UE, and a server is located in the data network. The data network may be a private network such as a local area network, or may be an external network that is not controlled by operators, such as the Internet, or may be a proprietary network jointly deployed by the operators, for example, for configuring an IP Multimedia Core Network Subsystem (IMS) service.

Figure 4:
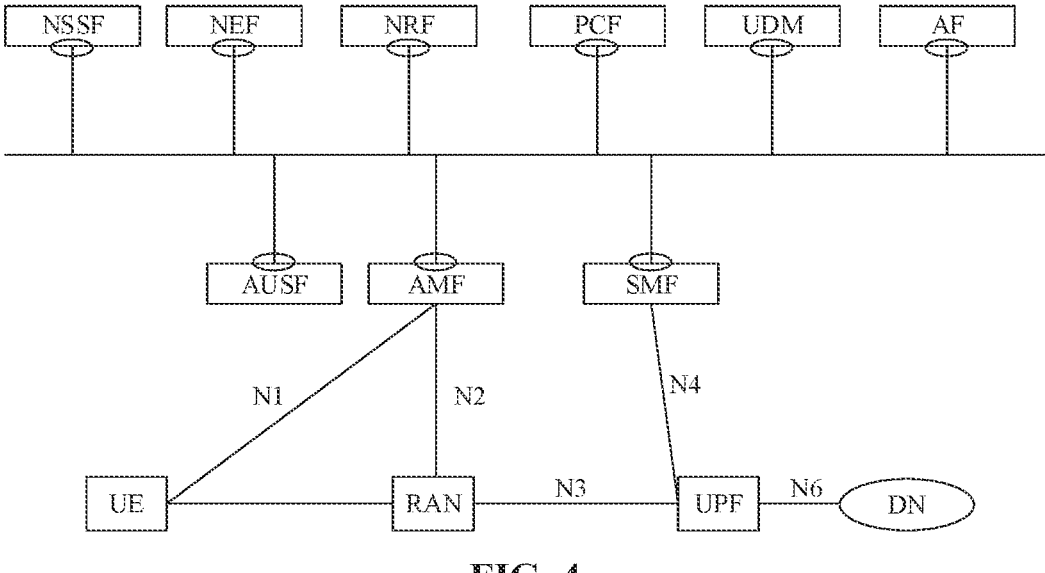
FIG. 4 is a schematic diagram of a 5GS architecture according to another embodiment of the present application.

FIG. 4 is a detailed architecture that is determined on the basis of FIG. 3. The core network user plane includes a User Plane Function (UPF). The core network control plane includes an Authentication Server Function (AUSF), an AMF, an SMF, a Network Slice Selection Function (NSSF), a Network Exposure Function (NEF), a NF Repository Function (NRF), Unified Data Management (UDM), a Policy Control Function (PCF), and an Application Function (AF). The functions of these function entities are as follows.

UPF: Executing subscriber data package forwarding according to a routing rule of the SMF.

AUSF: Executing security certification of the UE.

AMF: UE access management and mobility management.

SMF: UE session management.

NSSF: Selecting a network slice for the UE.

NEF: Opening a network function to a third party in a manner of a north API interface.

NRF: Providing a storage function and a selection function of network function entity information for other network elements.

UDM: User subscription context management.

PCF: User policy management.

AF: User application management.

In the architecture shown in FIG. 4, an N1 interface is a reference point between the UE and the AMF; an N2 interface is reference points of the RAN and the AMF, which is used to send an NAS message; an N3 interface is a reference point between the RAN and the UPF, which is used to transmit data of the user plane; N4 interface is a reference point between the SMF and the UPF, which is used to transmit information such as tunnel identification information and data caching indication information of N3 connection, and a downlink data notification message; and N6 interface is a reference point between the UPF and the DN, which is used to transmit the data of the user plane.

It is to be noted that, the name of the interface between the network elements in FIG. 3 and FIG. 4 is only an example. The name of the interface in a specific implementation may be other names, and the embodiments of the present application are not specifically limited thereto. The name of each network element (such as SMF, AF, UPF, and the like) included in FIG. 3 and FIG. 4 is also only an example, and does not limit the function of the network element itself. In the 5GS and other future networks, the above network elements may also have other names, and the embodiments of the present application are not specifically limited thereto. For example, in a 6G network, part or all of the above network elements may use the terms in 5G, and may also use other names, which are uniformly described herein, and are not described below again. In addition, it is to be understood that, the names of the messages (or signaling) transmitted between the above network elements are only an example, and do not constitute any limitation on the functions of the messages.

Figure 5:
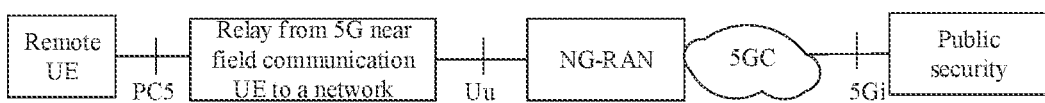
FIG. 5 is a schematic diagram of a relay communication system according to an embodiment of the present application.

FIG. 5 is a schematic diagram of a relay communication system according to an embodiment of the present application. The relay communication system shown in FIG. 5 mainly includes three portions: a wireless subsystem portion, an Evolved Packet Core (EPC) portion and a near field communication service portion.

The wireless subsystem portion, which is the EUTRAN, includes one or more eNodeBs, which may further be called an access network device portion in the EPS.

The EPC portion includes the HSS, the MME, the SGW, the PGW, and the like.

The near field communication service portion, which is a ProSe architecture portion, includes a ProSe Function (PF), a ProSe Application Server (PAS), a relay device (Relay UE), and a remote device (Remote UE). PF is used to authorize near field communication of the terminal device, provide discovery assistance between the terminal devices; PAS is used to provide specific near field communication service support; Relay UE is used to provide relay access support for the Remote UE; and Remote UE is used to access the network by means of the Relay UE, so as to obtain an Internet Protocol (IP) service. In an example, ProSe Applications (Pas) are installed in both the Relay UE and the Remote UE.

In an example, the relay communication may use different relay modes. Optionally, the relay communication includes the following relay modes: a layer 3-based relay mode (or called "Layer-3 UE-to-Network Relays"), a layer 2-based relay mode (or called "Layer 2 UE-to-Network Relays"), and a relay mode based on a Non-3rd Generation Partnership Project (3GPP) Inter Working Function (N3IWF) (or called "N3IWF-based relay"). The three relay modes are introduced and described respectively below.

Firstly, the layer 3-based relay mode is introduced and described.

Figure 6:
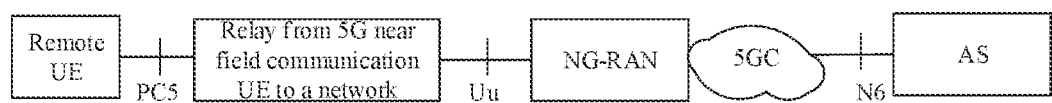
FIG. 6 is a schematic diagram of a relay communication system according to another embodiment of the present application.

As shown in FIG. 6, a ProSe 5G UE-to-Network Relay entity (hereinafter referred to as "relay device") provides a function for supporting a connection between the remote UE and the network. Optionally, the relay device may not only be applied to a public safety service, but also to a commercial service (such as an interactive service).

In an example, if the UE has successfully established a PC5 connection with a ProSe UE-to-Network relay (hereinafter referred to as "relay"), it is considered that the UE is the remote UE for the relay. The remote UE may be located within NG-RAN coverage or outside the NG-RAN coverage.

The remote UE may execute communication path selection between a direct Uu path and an indirect Uu path on the basis of link quality and a configured threshold (which is pre-configured or provided by NG-RAN). For example, if the Uu link quality exceeds a configured threshold, the direct Uu path is selected. Otherwise, the indirect Uu path is selected by executing discovery and selection of the relay.

The relay should relay a unicast service between the remote UE and the network (Uplink (UL) and Downlink (DL)). The relay should provide a general function that may relay any IP, Ethernet or Unstructured traffic.

For IP traffic over the PC5 reference point, the relay uses an IP-type PDU session toward 5GC.

For Ethernet traffic over the PC5 reference point, the relay may use an Ethernet-type PDU session or the IP-type PDU session toward the 5GC.

For an unstructured service over the PC5 reference point, the relay may use an unstructured-type PDU session or the IP-type PDU session (that is, IP encapsulation/decapsulation of the relay) toward the 5GC.

The type of traffic supported over the PC5 reference point is indicated by the relay, for example, using a corresponding Relay Service Code (RSC). The relay determines the PDU session type based on, such as, near field communication policies/parameters, a UE Routing Selection Policy (URSP) rule, and the RSC.

Note: how the relay determines the PDU session type should be independently evaluated, while considering other PDU session parameters, e.g. Data Network Names (DNNs) and SSC modes.

Optionally, the IP-type PDU session and the Ethernet-type PDU session may be used to support a plurality of remote UEs, and the unstructured-type PDU session may only use to support one remote UE.

Figure 7:
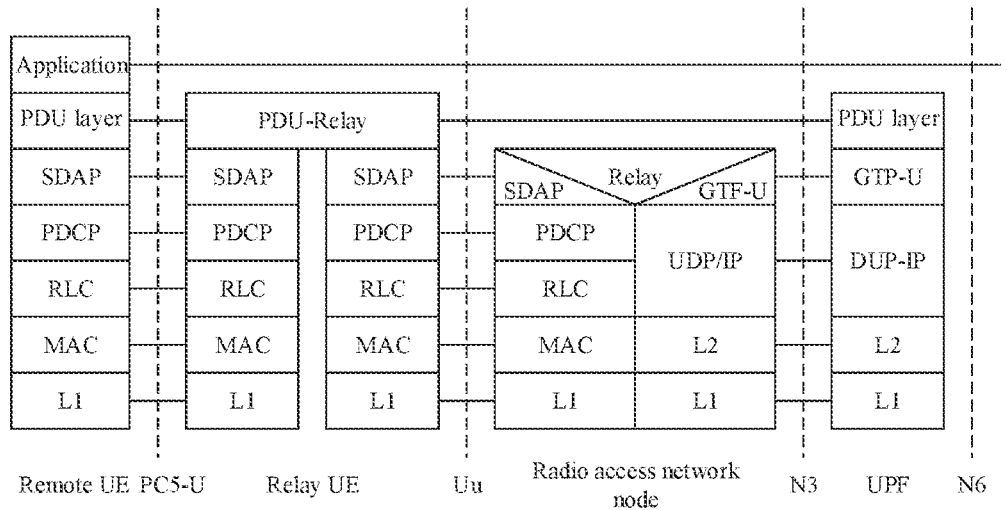
FIG. 7 is a protocol stack for Layer-3 UE-to-Network Relays according to an embodiment of the present application.

One-to-one direct communication is used between the remote UE and the relay. As shown in FIG. 7, FIG. 7 exemplarily shows a protocol stack for Layer-3 UE-to-Network Relays according to an embodiment of the present application.

Next, the layer 2-based relay mode is introduced and described.

The layer 2-based relay UE provides a forwarding function that may relay any type of traffic over a PC5 link.

The layer 2-based relay UE provides a function for supporting a connection to 5GS for the remote UE. If UE is considered to be a remote UE if it has successfully established a PC5 link to the layer 2-based relay UE. The remote UE may be located within NG-RAN coverage or outside of the NG-RAN coverage.

(1) User Plane Protocol Stack

Figure 8:
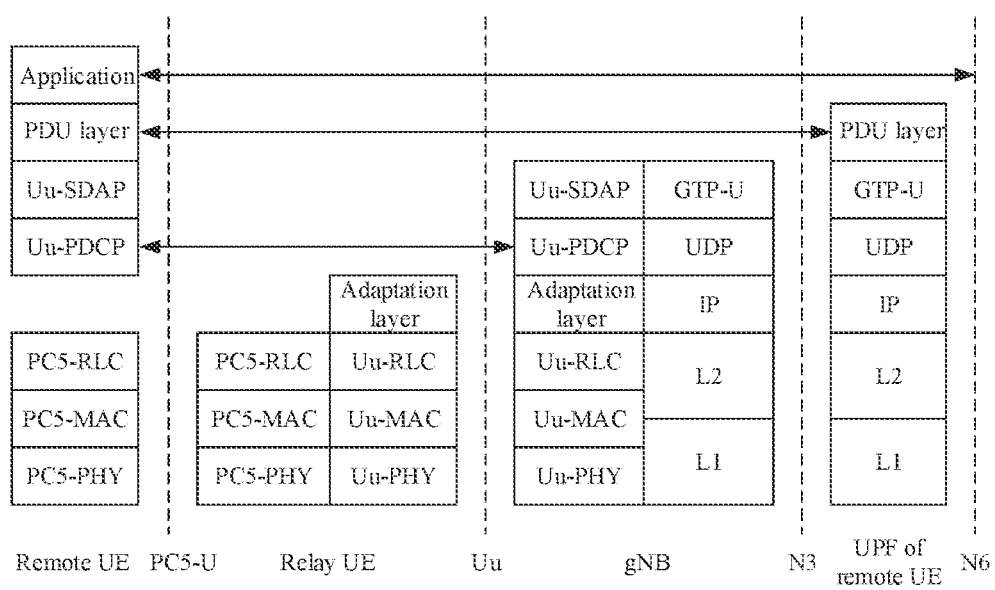
FIG. 8 is a protocol stack for a user plane related to a PDU session according to an embodiment of the present application.

FIG. 8 is a protocol stack of a user plane related to a PDU session according to an embodiment of the present application, including a layer 2-based relay UE. A PDU layer corresponds to a PDU carried between the remote UE and the DN over the PDU session. Note: two endpoints of a Packet Data Convergence Protocol (PDCP) link are the remote UE and gNB. The relay function is executed below the PDCP, which means that data security between the remote UE and the gNB can be ensured without exposing raw data at the relay device.

Adaptation layers in the relay UE and the gNB may differentiate Signaling Radio Bearers (SRB) and Data Radio Bearers (DRB) for a particular remote UE. The adaptation layers are also responsible for mapping PC5 traffic to one or more DRBs of Uu. Optionally, RAN WG2 is responsible for the definition of the adaptation layer.

(2) Control Plane Protocol Stack

Figure 9:
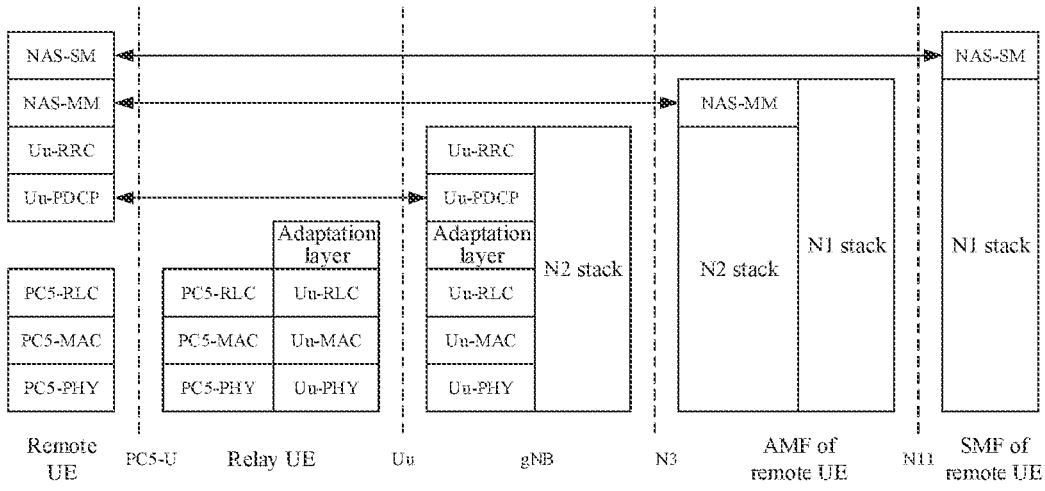
FIG. 9 is a protocol stack of an NAS connection from a remote UE to NAS-MM and NAS-SM assemblies according to an embodiment of the present application.

FIG. 9 is a protocol stack of an NAS connection from a remote UE to NAS-MM and NAS-SM assemblies according to an embodiment of the present application. Optionally, the NAS messages are transparently transferred between the remote UE and the gNB over the layer 2-based relay UE using:

(1) A PDCP end-to-end connection, where the role of the relay UE is to relay the PDUs over the signaling radio bearer without any modification.

(2) An N2 connection between the gNB and the AMF over N2.

(3) An N11 connection between the AMF and the SMF over N11.

The role of the relay UE is to relay the PDUs from the signaling radio bearer without any modification.

Finally, the N3IWF-based relay mode is introduced and described.

Figure 10:
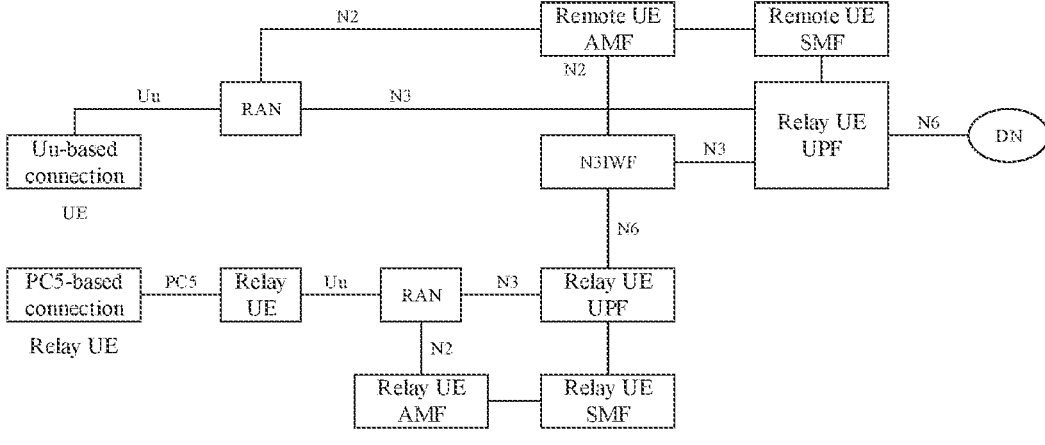
FIG. 10 is a schematic diagram of a solution supporting end-to-end security for remote UE traffic transmitted using Layer-3 UE-to-Network Relays according to an embodiment of the present application.

FIG. 10 is a schematic diagram of a solution supporting end-to-end security for remote UE traffic transmitted using Layer-3 UE-to-Network Relays according to an embodiment of the present application.

When access to the N3IWF is used, the relay should be able to relay control plane traffic (NAS) and user plane unicast traffic (UL and DL) between the remote UE and the network toward the N3IWF. Optionally, one-to-one direct communication is used between the remote UE and the relay, so as to achieve unicast traffic.

Figure 11:
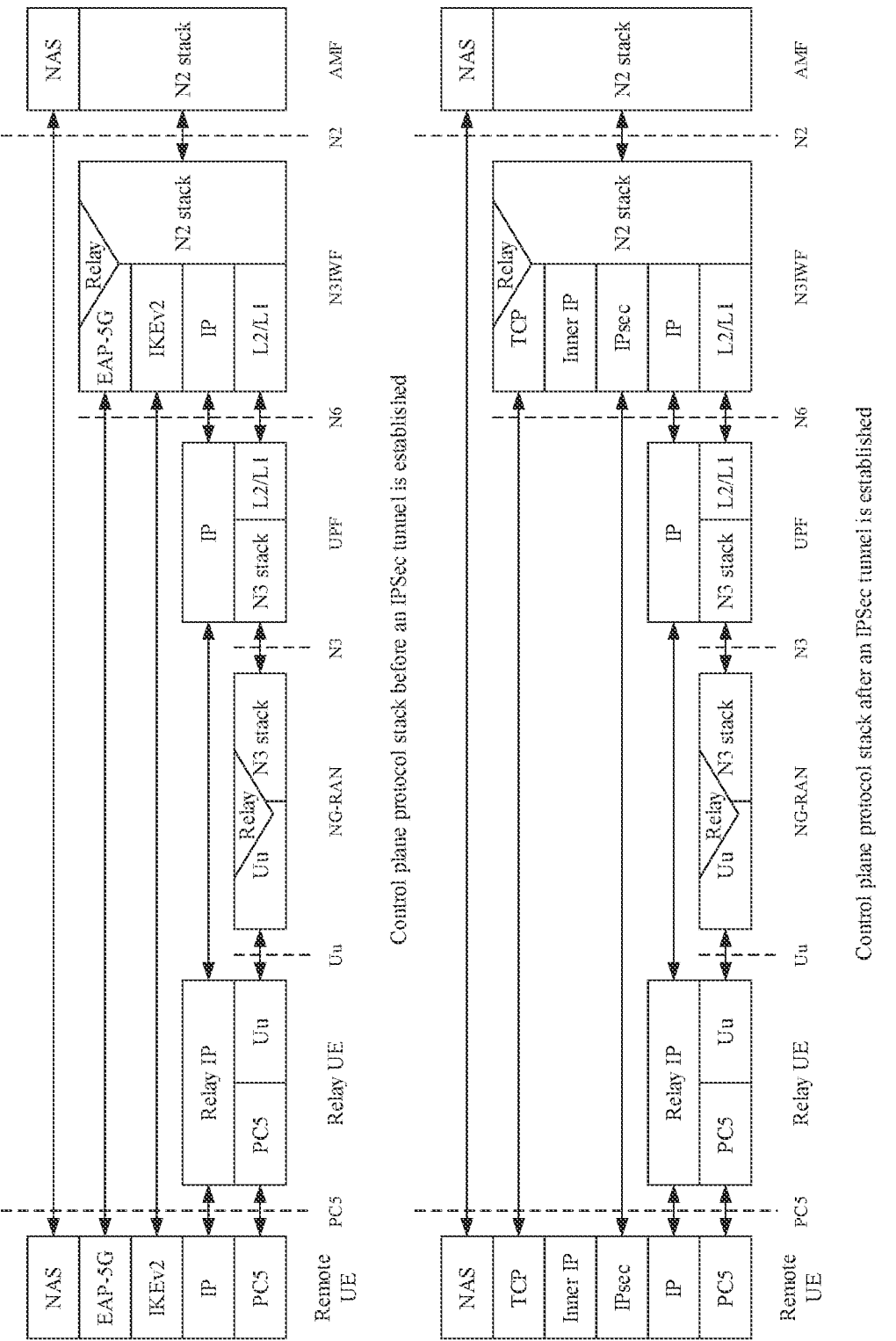
FIG. 11 is a control plane protocol stack before an IPSec tunnel is established and after the IPSec tunnel is established according to an embodiment of the present application.

The remote UE establishes a signaling IPsec tunnel with the N3IWF over relay access using an Internet Key Exchange (IKE) Protocol. In addition, Similar to untrusted non-3GPP access, the subsequent NAS message between the UE and the N3IWF is exchanged via signaling IPsec SA over a Transmission Control Protocol (TCP)/IP. As shown in FIG. 11, the protocol stacks for the control plane before an IPSec tunnel is established and after the IPSec tunnel is established are the same as the untrusted non-3GPP access protocol stack.

The remote UE supports the NAS-MM (after registration), SMS and PDU session establishment/modification/ release processes with the 5GC by transporting corresponding NAS signaling over the signaling IPsec tunnel established with the N3IWF.

The remote UE sends/receives UP traffic over the relay PDU session established for the remote UE over PC5 relay path via child IPSec SA tunnel to the N3IWF. The PCF may provide corresponding URSP rule to assist the remote UE to identify a service that requires access to the N3IWF. During deployment, the UPE and the N3IWF of the relay UE may be configured.

Figure 12:
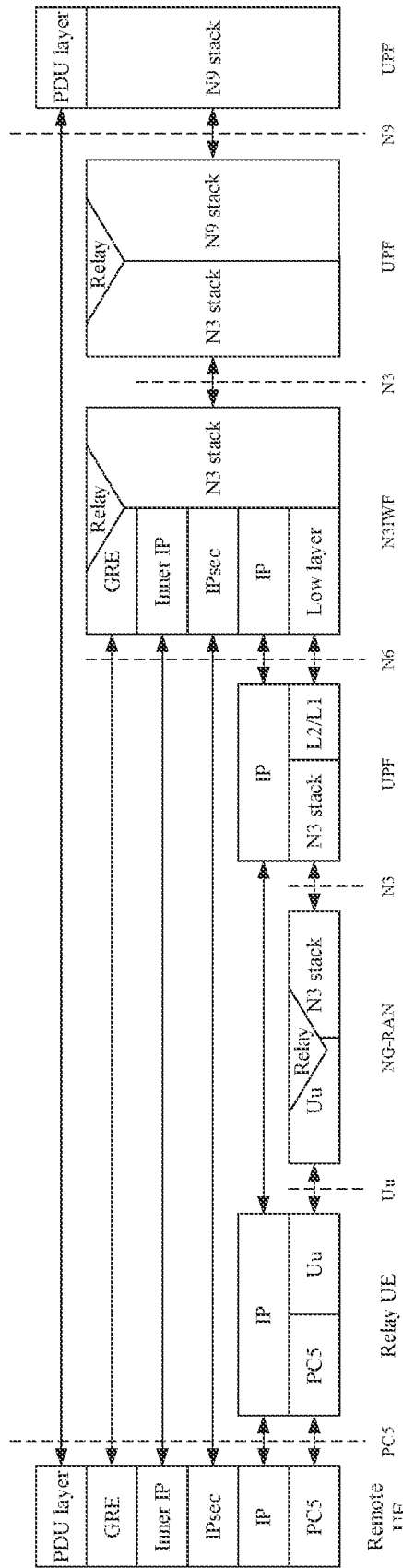
FIG. 12 is a user plane protocol stack for layer 3-based relay access via the N3IWF according to an embodiment of the present application.

As shown in FIG. 12, the user plane protocol stack for layer 3-based relay access via the N3IWF is the same as the user plane protocol stack for untrusted non-3GPP access. The PDU session type used between the relay UE and the relay UE UPF is IP. However, the traffic that is transmitted in the PDU layer between the remote UE and the UPF (PDU session anchor) may be IP, Ethernet or unstructured.

Compared with a layer 3-based relay solution, the NG-RAN (gNB) does not have does not have any different treatment for the traffic of the remote UE with the N3IWF-based relay mode.

It can be seen from the above description that, during relay communication, the remote device needs to discover a relay device. In an example, the relay device can be discovered by the remote device by using a model A and a model B.

Figure 13:
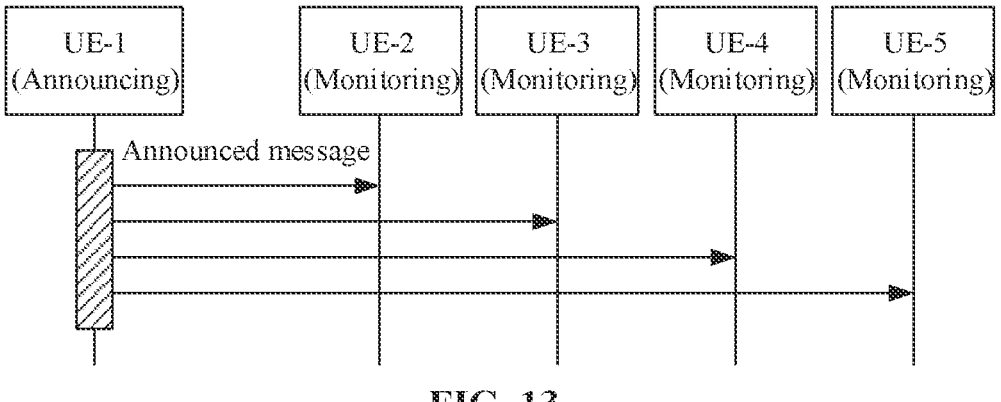
FIG. 13 is a schematic diagram of a mode in which a remote device discovers a relay device according to an embodiment of the present application.

The model A is shown in FIG. 13, UE-1 announces a message, and the other UEs monitor the message that is announced by the UE-1. Optionally, the message that is announced by the UE-1 is a discovery message. The discovery message may carry a device identification of the UE-1 and so on. If the other UEs monitor and receive the discovery message, it is known that the UE-1 may provide a relay service. That is to say, the UE-1 may be used as a relay device.

Figure 14:
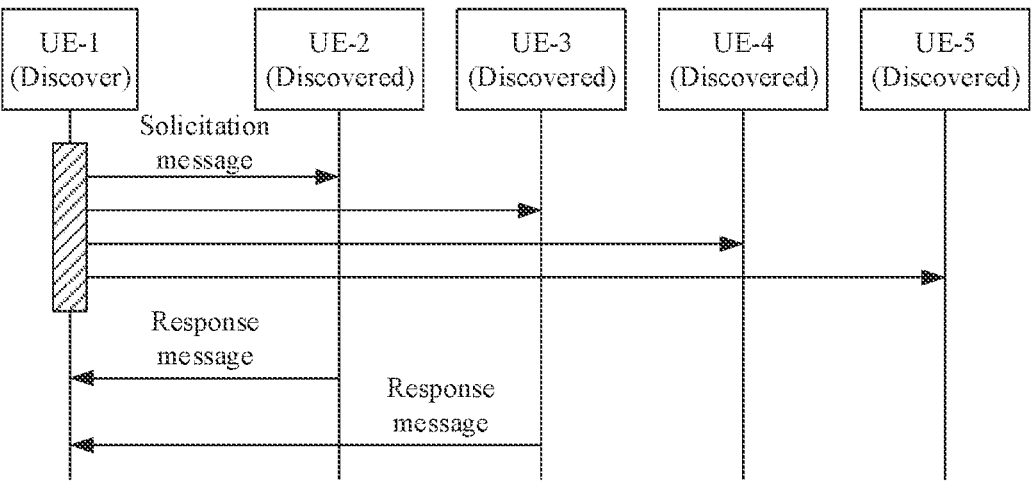
FIG. 14 is a schematic diagram of a mode in which a remote device discovers a relay device according to another embodiment of the present application.

The model B is shown in FIG. 14. The UE-1 sends a solicitation message to other UEs, to request for acquiring the relay service. After receiving the solicitation message, the other UEs may send response messages to the UE-1 if the relay service may be provided, so as to indicate that the UE-1 may provide a relay server. Optionally, the device identification of the UE is included in the response message. For example, the UE-1 sends solicitation messages to UE-2 to UE-5. The UE-2 and the UE-3, which can provide the relay services, may each send a response message to the UE-1. The response message sent by the UE-2 may carry the device identification of the UE-2. The response message sent by the UE-3 may carry the device identification of the UE-3. After the UE-1 receives the response messages, it may be known that the UE-2 and the UE-3 can provide the relay services. That is to say, the UE-2 and the UE-3 may be used as the relay devices.

Since different relay devices have different relay capabilities and the relay capabilities to which different remote devices can adapt are also different, the remote device needs to consider different relay capabilities during the discovery and selection of the relay devices. Based on this, an embodiment of the present application provides a method for selecting a relay device. The technical solutions of the present application are described below with reference to several embodiments.

Figure 15:
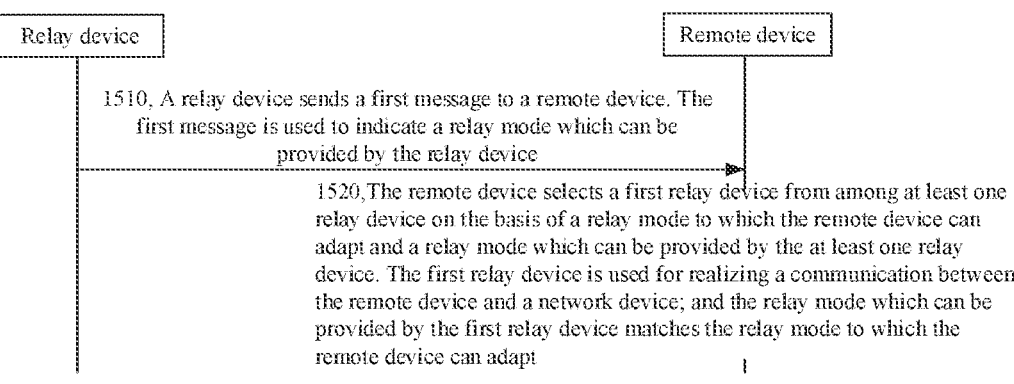
FIG. 15 is a flowchart of a method for selecting a relay device according to an embodiment of the present application.

FIG. 15 is a flowchart of a method for selecting a relay device according to an embodiment of the present application. The method may be applied to a communication system shown in FIG. 1. The method may include the following operations (S1510 to S1520).

At S1510, a relay device sends a first message to a remote device. The first message is used to indicate a relay mode which can be provided by the relay device.

During relay communication, a remote device needs to discover a relay device. It can be seen from the above description that, the relay device can be discovered by the remote device through a announce message (hereinafter referred to as "discovery message") from the relay device, or through the remote device sending a solicitation message and then receiving a response message (hereinafter referred to as "response message for a relay solicitation message"). In order to cause the remote device to know relay modes which can be provided by respective relay devices, and facilitate the remote device to select an suitable relay device for relay communication, in the embodiments of the present application, in a process that the remote device discovers the relay device, the first message from the relay device to the remote device is used to indicate the relay mode which can be provided by the relay device. The first message is a discovery message or a response message for a relay solicitation message.

How the first message indicates the relay mode which can be provided by the relay device is not limited in the embodiments of the present application. Optionally, the first message directly indicates the relay mode which can be provided by the relay device, so that the remote device may know the relay mode which can be provided by the relay device after receiving the first message. Alternatively, the first message indirectly indicates the relay mode which can be provided by the relay device. For example, the first message includes information associated with the relay mode which can be provided by the relay device, so that the remote device may determine, according to the associated information, the relay mode which can be provided by the relay device after receiving the first message. For other descriptions about the manner that the first message indicates the relay mode which can be provided by the relay device, refer to the following embodiments, and details are not described herein again.

At S1520, the remote device selects a first relay device from among at least one relay device on the basis of a relay mode to which the remote device can adapt and a relay mode which can be provided by the at least one relay device. The first relay device is used for implementing a communication between the remote device and a network device; and the relay mode which can be provided by the first relay device matches the relay mode to which the remote device can adapt.

In a process that the remote device discovers the relay device, generally, there is at least one relay device sending the first message to the remote device, so that the remote device can know the relay mode which can be provided by the at least one relay device. Then, the remote device may select the first relay device from among at least one relay device on the basis of the relay mode which can be provided by the at least one relay device and the relay mode to which the remote device can adapt. The first relay device is used to implement the communication between the remote device and the network device, that is to say, achieving relay communication.

Optionally, the type of the relay mode includes at least one of the following: a layer 3-based relay mode, a layer 2-based relay mode, and an N3IWF-based relay mode. The description of the three relay modes refer to the above method embodiments, and details are not described herein again. In the embodiments of the present application, the type and number of the relay modes to which the remote device can adapt and the type and the number of the relay modes which can be provided by the relay device are not limited. For example, there are two relay modes to which the remote device can adapt, which respectively are the layer 3-based relay mode and the layer 2-based relay mode. There are also two relay modes which can be provided by the relay device, which respectively are the layer 2-based relay mode and the N3IWF-based relay mode.

In a process of selecting the relay device, the remote device may compare the relay mode which can be provided by the at least one relay device with the relay mode to which the relay device can adapt, and select, from the at least one relay device, a relay device, which is the first relay device, corresponding to the relay mode matching the relay mode to which the relay device can adapt. In the embodiments of the present application, a specific manner of determining whether the relay modes match is not limited. Several manners of determining whether the relay modes match provided in the embodiments of the present application are exemplarily shown below.

Optionally, the remote device determines that the relay modes match if a relay mode which can be provided is the same as the relay mode to which the remote device can adapt. Therefore, the relay mode which can be provided by the first relay device is the same as the relay mode to which the remote device can adapt. For example, there are two relay modes to which the remote device can adapt, and the two relay modes respectively are the layer 3-based relay mode and the layer 2-based relay mode. Only if there are also two relay modes which can be provided by a certain relay device and the two relay modes respectively are the layer 3-based relay mode and the layer 2-based relay mode, the relay device can be selected for performing relay communication.

Optionally, the remote device determines that the relay modes match if the relay mode which can be provided includes the relay mode to which the remote device can adapt. Therefore, the relay mode which can be provided by the first relay device includes the relay mode to which the remote device can adapt. For example, there are two relay modes to which the remote device can adapt and the two relay modes respectively are the layer 3-based relay mode and the layer 2-based relay mode. If there are three relay modes which can be provided by a certain relay device and the three relay modes respectively are the layer 3-based relay mode, the layer 2-based relay mode and the N3IWF-based relay mode, the relay device can be selected for performing relay communication.

Optionally, the remote device determines that the relay modes match if the relay mode to which the remote device can adapt includes the relay mode which can be provided. Therefore, the relay mode to which the remote device can adapt includes the relay mode which can be provided by the first relay device. For example, there are three relay modes to which the remote device can adapt and the three relay modes respectively are the layer 3-based relay mode, the layer 2-based relay mode and the N3IWF-based relay mode. If there are two relay modes which can be provided by a certain relay device and the two relay modes respectively are the layer 3-based relay mode and the layer 2-based relay mode, the relay device can be selected for performing relay communication.

It is to be noted that, in the embodiments of the present application, when whether the relay modes match is determined, it is not necessary to require all relay modes to match. If the relay modes which can be provided by a certain relay device only partially match the relay modes to which the remote device can adapt, it may also be considered that the relay mode which can be provided by the relay device matches the relay mode to which the remote device can adapt. For example, there are two relay modes to which the remote device can adapt and the two relay modes respectively are the layer 3-based relay mode and the layer 2-based relay mode. If there are two relay modes which can be provided by a certain relay device and the two relay modes respectively are the layer 2-based relay mode and the N3IWF-based relay mode, since the relay modes which can be provided by the relay device and the relay modes to which the remote device can adapt include a same relay mode, that is, the layer 2-based relay mode, in this case, it may be determined that the relay mode which can be provided by the relay device matches the relay mode to which the remote device can adapt.

Based on this, that the relay mode which can be provided by the first relay device matches the relay mode to which the remote device can adapt includes any one of the following: the relay mode which can be provided by the first relay device selected by the remote device is the same as the relay mode to which the remote device can adapt; the relay mode which can be provided by the first relay device selected by the remote device includes the relay mode to which the remote device can adapt; and the relay mode to which the remote device can adapt includes the relay mode which can be provided by the first relay device.

In conclusion, according to the technical solutions provided in the embodiments of the present application, in a process of the remote device discovering a relay device, a message from the relay device to the remote device is set to indicate the relay mode which can be provided by the relay device, so that the remote device can select a suitable relay device from among the at least one relay device according to the relay mode which can be provided by the at least one relay device and the relay mode to which the remote device can adapt, so as to implement relay communication. Since the relay mode which can be provided by the suitable relay device matches the relay mode to which the remote device can adapt, unable relay communication due to the mismatch of the relay modes can be avoided, so that a relay communication process can be efficiently and stably realized. In addition, according to the embodiments of the present application, the relay device can be selected according to the relay mode which can be provided by the relay device and the relay mode to which the remote device can adapt. Therefore, the relay capabilities of different devices are taken into full consideration, and a selection mechanism of the relay device can be further improved.

The manner of how the first message indicates the relay mode which can be provided by the relay device is described below.

Figure 16:
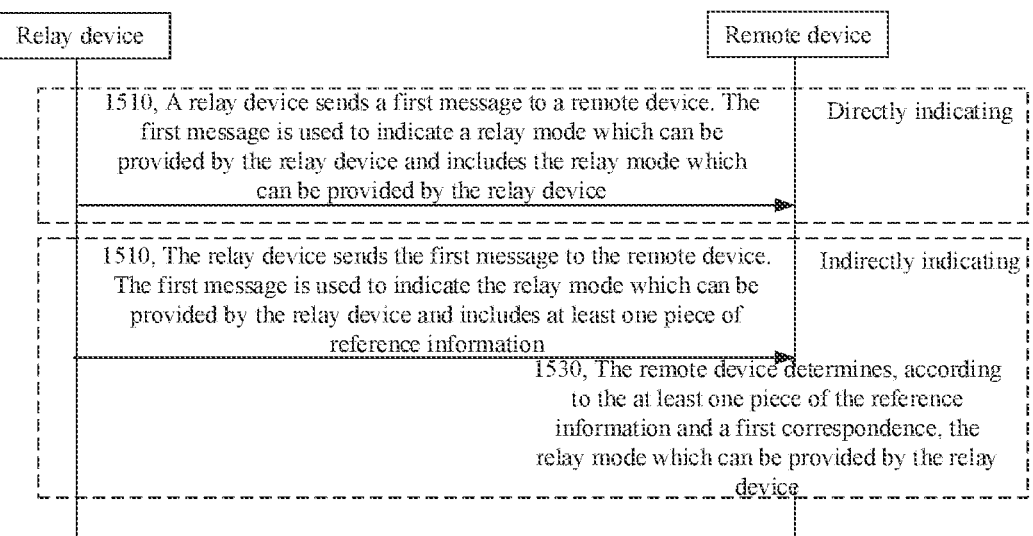
FIG. 16 is a schematic diagram of a first message indicating a relay mode which can be provided by a relay device according to an embodiment of the present application.

In an example, as shown in FIG. 16, the first message includes the relay mode which can be provided by the relay device.

The relay mode which can be provided by the relay device may directly indicated by the relay device via the first message. That is, the relay mode which can be provided by the relay device may be included in the first message. Therefore, after receiving the first message, the remote device parses the first message to know the relay mode which can be provided by the relay device.

In another example, as shown in FIG. 16, the first message includes at least one piece of reference information.

It can be seen from the above description that, the relay mode which can be provided by the relay device may also be indirectly indicated by the relay device via the first message. That is to say, the first message may include information (also called "reference information") associated with the relay mode which can be provided. Optionally, the relay mode which can be provided by the relay device corresponds to at least one piece of the following reference information: a PLMN, a RAT, a RSC, a DNN, or a network slice. Therefore, the first message may include at least one piece of the above reference information.

If the relay device do not directly indicate the relay mode which can be supported, after receiving the first message, the remote device is required to determine the relay mode which can be provided by the relay device according to the at least one piece reference information included in the first message. Based on this, as shown in FIG. 16, the above method further includes S1530 in which the remote device determines the relay mode which can be provided by the relay device according to the at least one piece of the reference information and a first correspondence. The first correspondence includes a correspondence between at least one piece of the reference information and a relay mode which can be provided by the relay device. According to at least one piece of the reference information, a relay mode corresponding to the reference information can be determined from the first correspondence, so that the determined relay mode can be determined as the relay mode which can be provided by the relay device.

In the embodiments of the present application, the manner of determining the first correspondence is not limited. Optionally, the first correspondence is pre-configured in the remote device. For example, the first correspondence is pre-configured in a Subscriber Identity Module (SIM) of the remote device. Alternatively, the first correspondence is pre-defined over a communication protocol. Alternatively, the first correspondence is sent by a network device corresponding to the remote device to the remote device. Optionally, the network device corresponding to the remote device includes a resident network device for the remote device (which is a network device corresponding to a network on which the remote device resides). Then, the resident network device may carry the first correspondence in a broadcasted system message. Optionally, the network device corresponding to the remote device includes a register network device of the remote device (which is a network device corresponding to a network for registering the remote device). Then, the register network device may carry the first correspondence in a registration message.

It is to be noted that, when the relay mode which can be provided by the relay device is directly indicated by the relay device via the first message, that is, when the relay mode which can be provided by the relay device is directly included in the first message, the relay mode which can be provided by the relay device may also correspond to the at least one piece of reference information. Optionally, the relay device determines, according to the at least one piece of reference information, the relay mode which can be provided by the relay device, and carries the relay mode in the first message and send it to the remote device.

In conclusion, according to the technical solutions provided in the embodiments of the present application, in the process of a remote device discovering a relay device, a relay mode which can be provided by the relay device is carried in a message that is sent from the relay device to the remote device, so that the purpose of directly indicating the relay mode which can be provided by the relay device can be achieved. In addition, in the embodiments of the present application, in the process of the remote device discovering the relay device, reference information is carried by a message that is sent from the relay device to the remote device, so that the remote device may determine, according to the reference information, a relay mode which can be provided by the relay device. Therefore, the purpose of indirectly indicating the relay mode which can be provided by the relay device can be achieved.

The at least one relay mode to which the remote device can adapt and the at least one relay mode which can be provided by the relay device are respectively described below.

In an example, the at least one relay mode to which the remote device can adapt includes at least one of the following: a relay mode that is supported by the remote device, or a relay mode that is authorized by the remote device.

In the embodiments of the present application, the at least one relay mode to which the remote device can adapt includes: the relay mode that is supported by the remote device, the relay mode that is authorized by the remote device, or the relay mode that is supported and authorized by the remote device.

Optionally, the relay mode that is supported by the remote device includes at least one of the following: a relay mode that is supported on the basis of the PLMN, a relay mode that is supported on the basis of the registration area, or a relay mode that is supported on the basis of the RAT.

The PLMN may be a PLMN where the remote device is currently located, and the relay mode that is supported on the basis of the PLMN may be a relay mode which may be supported by the remote device at the PLMN. For example, PLMN 1 supports the layer 2-based relay mode, and PLMN 2 supports the layer 3-based relay mode. Then, the remote device supports the layer 2-based relay mode at PLMN 1, and the remote device supports the layer 3-based relay mode at PLMN 2.

The registration area is a registration area for the remote device, and the relay mode that is supported on the basis of the registration area may be a relay mode which may be supported by the remote device when registering in the registration area. For example, the registration area 1 supports the layer 2-based relay mode, and the registration area 2 supports the layer 3-based relay mode. Then, the remote device supports the layer 2-based relay mode when registering in the registration area 1, and the remote device supports the layer 3-based relay mode when registering in the registration area 2.

The RAT is a radio access technology corresponding to the remote device, and the relay mode that is supported on the basis of the RAT may be a relay mode that may be supported by the remote device when accessing the network over the RAT. For example, the RAT 1 supports the layer 2-based relay mode, and the RAT 2 supports the layer 3-based relay mode. Then, the remote device supports the layer 2-based relay mode when accessing a network over the RAT 1, and the remote device supports the layer 3-based relay mode when accessing a network over the RAT 2.

It is to be noted that, the above several manners of determining the relay mode that is supported by the remote device may also be used in combination. For example, the relay mode that is supported by the remote device includes relay modes that are supported on the basis of the PLMN and the registration area. For example, the PLMN 1 supports the layer 2-based relay mode, and the registration area 1 supports the layer 2-based relay mode and the N3IWF-based relay mode. Then, the remote device supports the layer 2-based relay mode when registering in the registration area 1 and being located at the PLMN 1, that is, a relay mode that is supported by both the registration area 1 and the PLMN

1. Alternatively, the remote device supports the layer 2-based relay mode and the N3IWF-based relay mode when registering in the registration area 1 and being located at the PLMN 1, that is, the remote device supports all relay modes that are supported by the registration area 1 and the PLMN 1.

Optionally, the relay mode that is authorized by the remote device includes at least one of the following: a relay mode that is authorized on the basis of the PLMN, a relay mode that is authorized on the basis of the registration area, or a relay mode that is authorized on the basis of the RAT.

The PLMN may be a PLMN where the remote device is currently located, and the relay mode that is authorized on the basis of the PLMN may be a relay mode which may be authorized by the remote device at the PLMN. For example, the layer 2-based relay mode is authorized by PLMN 1, and the layer 3-based relay mode is authorized by PLMN 2. Then, the layer 2-based relay mode is authorized by the remote device at PLMN 1, and the layer 3-based relay mode is authorized by the remote device at PLMN 2.

The registration area is a registration area for the remote device, and the relay mode that is authorized on the basis of the registration area may be a relay mode which may be authorized by the remote device when registering in the registration area. For example, the layer 2-based relay mode is authorized by a registration area 1, and the layer 3-based relay mode is authorized by a registration area 2. Then, the layer 2-based relay mode is authorized by the remote device when registering in the registration area 1, and the layer 3-based relay mode is authorized by the remote device when registering in the registration area 2.

The RAT is a RAT corresponding to the remote device, and the relay mode that is authorized on the basis of the RAT may be a relay mode that may be authorized by the remote device when accessing the network over the RAT. For example, the layer 2-based relay mode is authorized by the RAT 1, and the layer 3-based relay mode is authorized by the RAT 2. Then, the layer 2-based relay mode is authorized by the remote device when accessing the network over the RAT 1, and the layer 3-based relay mode is authorized by the remote device when accessing the network over the RAT 2.

It is to be noted that, the above several manners of determining the relay mode that is authorized by the remote device may also be used in combination. For example, the relay mode that is authorized by the remote device includes relay modes that are authorized on the basis of the PLMN and the registration area. For example, the layer 2-based relay mode is authorized by the PLMN 1, and the layer 2-based relay mode and the N3IWF-based relay mode are authorized by the registration area 1. Then, the layer 2-based relay mode is authorized by the remote device when registering in the registration area 1 and being located at the PLMN 1, that is, the relay mode that is supported by both the registration area 1 and the PLMN 1. Alternatively, the layer 2-based relay mode and the N3IWF-based relay mode are authorized by the remote device when registering in the registration area 1 and being located at the PLMN 1. That is to say, the remote device supports all relay modes that are authorized by the registration area 1 and the PLMN 1.

In an example, the relay mode which can be provided by the relay device includes at least one of the following: a relay mode that is supported by the relay device, a relay mode that is authorized by the relay device, or a relay mode which can be provided by a network device corresponding to the relay device.

In the embodiments of the present application, the relay mode which can be provided by the relay device includes: a relay mode that is supported by the relay device, or a relay mode that is authorized by the relay device, or a relay mode which can be provided by a network device corresponding to the relay device, or a relay mode which is supported by the relay device and can be provided by the network device corresponding to the relay device, or a relay mode which is supported and authorized by the relay device, or a relay mode which is authorized by the relay device and can be provided by the network device corresponding to the relay device, or a relay mode which is supported and authorized by the relay device and can be provided by a network device corresponding to the relay device.

Optionally, the relay mode that is supported by the relay device includes at least one of the following: a relay mode that is supported on the basis of the PLMN, a relay mode that is supported on the basis of the registration area, or a relay mode that is supported on the basis of the RAT.

The PLMN may be a PLMN where the relay device is currently located, and the relay mode that is supported on the basis of the PLMN may be a relay mode which may be supported by the relay device at the PLMN. For example, PLMN 1 supports the layer 2-based relay mode, and PLMN 2 supports the layer 3-based relay mode. Then, the relay device supports the layer 2-based relay mode at PLMN 1, and the relay device supports the layer 3-based relay mode at PLMN 2.

The registration area is a registration area for the relay device, and the relay mode that is supported on the basis of the registration area may be a relay mode which may be supported by the relay device when registering in the registration area. For example, the registration area 1 supports the layer 2-based relay mode, and the registration area 2 supports the layer 3-based relay mode. Then, the relay device supports the layer 2-based relay mode when registering in the registration area 1, and the relay device supports the layer 3-based relay mode when registering in the registration area 2.

The RAT is an RAT corresponding to the relay device, and the relay mode that is supported on the basis of the RAT may be a relay mode that may be supported by the relay device when accessing the network over the RAT. For example, the RAT 1 supports the layer 2-based relay mode, and the RAT 2 supports the layer 3-based relay mode. Then, the relay device supports the layer 2-based relay mode when accessing the network over the RAT 1, and the relay device supports the layer 3-based relay mode when accessing the network over the RAT 2.

It is to be noted that, the above several manners of determining the relay mode that is supported by the relay device may also be used in combination. For example, the relay mode that is supported by the relay device includes relay modes that are supported on the basis of the PLMN and the registration area. For example, the PLMN 1 supports the layer 2-based relay mode, and the registration area 1 supports the layer 2-based relay mode and the N3IWF-based relay mode. Then, the relay device supports the layer 2-based relay mode when registering in the registration area 1 and being located at the PLMN 1, that is, the relay mode that is supported by both the registration area 1 and the PLMN 1. Alternatively, the relay device supports the layer 2-based relay mode and the N3IWF-based relay mode when registering in the registration area 1 and being located at the PLMN 1. That is to say, the relay device supports all relay modes that are supported by the registration area 1 and the PLMN 1.

Optionally, the relay mode that is authorized by the relay device includes at least one of the following: a relay mode that is authorized on the basis of the PLMN, a relay mode that is authorized on the basis of the registration area, or a relay mode that is authorized on the basis of the RAT.

The PLMN may be a PLMN where the relay device is currently located, and the relay mode that is authorized by the PLMN may be a relay mode which may be authorized by the relay device at the PLMN. For example, the layer 2-based relay mode is authorized by PLMN 1, and the layer 3-based relay mode is authorized by PLMN 2. Then, the layer 2-based relay mode is authorized by the relay device at PLMN 1, and the layer 3-based relay mode is authorized by the relay device at PLMN 2.

The registration area is a registration area for the relay device, and the relay mode that is authorized on the basis of the registration area may be a relay mode which may be authorized by the relay device when registering in the registration area. For example, the layer 2-based relay mode is authorized by the registration area 1, and the layer 3-based relay mode is authorized by the registration area 2. Then, the layer 2-based relay mode is authorized by the relay device when registering in the registration area 1, and the layer 3-based relay mode is authorized by the relay device when registering in the registration area 2.

The RAT is a RAT corresponding to the relay device, and the relay mode that is authorized on the basis of the RAT may be a relay mode that may be authorized by the relay device when accessing a network over the RAT. For example, the layer 2-based relay mode is authorized by RAT 1, and the layer 3-based relay mode is authorized by the RAT 2. Then, the layer 2-based relay mode is authorized by the relay device when accessing the network over the RAT 1, and the layer 3-based relay mode is authorized by the relay device when accessing the network over the RAT 2.

It is to be noted that, the above several manners of determining the relay mode that is authorized by the relay device may also be used in combination. For example, the relay mode that is authorized by the relay device includes relay modes that are authorized on the basis of the PLMN and the registration area. For example, the layer 2-based relay mode is authorized by the PLMN 1, and the layer 2-based relay mode and the N3IWF-based relay mode are authorized by the registration area 1. Then, the layer 2-based relay mode is authorized by the relay device when registering in the registration area 1 and being located at the PLMN 1. That is, the relay device supports a relay mode that is supported by both the registration area 1 and the PLMN 1. Alternatively, the layer 2-based relay mode and the N3IWF-based relay mode are authorized by the relay device when registering in the registration area 1 and being located at the PLMN 1. That is to say, the relay device supports all relay modes that are authorized by the registration area 1 and the PLMN 1.

Optionally, the network device corresponding to the relay device includes at least one of the following: a resident network device for the relay device, or a register network device for the relay device. The resident network device for the relay device is a network device corresponding to a network on which the relay device is resided. The register network device for the relay device is a network device corresponding to a network for registering the relay device. Optionally, a relay mode which can be provided by the resident network device for the relay device is carried in a system message broadcasted by the resident network device for the relay device. That is to say, the resident network device carries the relay mode which can be provided by the resident network device in the system message broadcasted by the resident network device. Optionally, a relay mode which can be provided by the register network device for the relay device is carried in a registration message sent by the register network device. That is to say, the register network device carries the relay mode which can be provided by the register network device in the registration message.

In conclusion, according to the technical solutions provided in the embodiments of the present application, by means of providing a plurality of manners for determining a relay mode to which a remote device can adapt, the flexibility of the remote device determining the relay mode to which the remote device can adapt can be improved. In addition, in the embodiments of the present application, a plurality of manners for determining a relay mode which can be provided by the relay device are provided, so that the flexibility of the relay device determining the relay mode to which the relay device can adapt can be improved.

It is to be noted that, in the embodiments of the present application, the method for selecting the relay device provided in the embodiments of the present application is described from the perspective of interaction between the remote device and the relay device. The steps executed by the remote device may be separately implemented as a method for selecting a relay device at the remote device side. The steps executed by the relay device may be separately implemented as a method for selecting a relay device at the relay device side.

The following is the apparatus embodiments of the present application, which may be used to execute the method embodiments of the present application. For details that are not disclosed in the apparatus embodiments of the present application, refer to the method embodiments of the present application.

Figure 17:
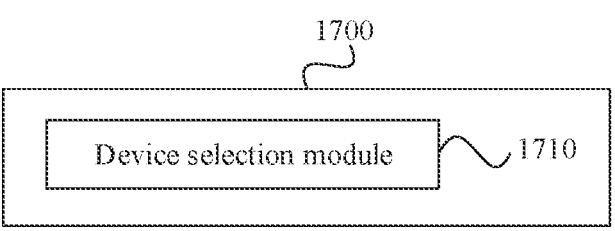
FIG. 17 is a block diagram of an apparatus for selecting a relay device according to an embodiment of the present application.

FIG. 17 is a block diagram of an apparatus for selecting a relay device according to an embodiment of the present application. The apparatus has the function of implementing the above method examples on the remote device side, and the function may be implemented by means of hardware or by means of hardware executing corresponding software. The apparatus may be the remote device introduced above, or may be disposed in the remote device. As shown in FIG. 17, the apparatus 1700 may include a device selection module 1710.

The device selection module 1710 is configured to select a first relay device from among at least one relay device on the basis of a relay mode to which the remote device can adapt and a relay mode which can be provided by the at least one relay device. The first relay device is used for implementing a communication between the remote device and a network device. The relay mode which can be provided by the first relay device matches the relay mode to which the remote device can adapt.

In an example, the relay mode which can be provided by the first relay device matches the relay mode to which the remote device can adapt in a manner including any one of the following: the relay mode which can be provided by the first relay device is the same as the relay mode to which the remote device can adapt; the relay mode which can be provided by the first relay device includes the relay mode to which the remote device can adapt; and the relay mode to which the remote device can adapt includes the relay mode which can be provided by the first relay device.

In an example, the relay mode to which the remote device can adapt includes at least one of the following: a relay mode that is supported by the remote device, or a relay mode that is authorized by the remote device.

In an example, the relay mode that is supported by the remote device includes at least one of the following: a relay mode that is supported on the basis of the PLMN, a relay mode that is supported on the basis of the registration area, or a relay mode that is supported on the basis of the RAT.

In an example, the relay mode that is authorized by the remote device includes at least one of the following: a relay mode that is authorized on the basis of the PLMN, a relay mode that is authorized on the basis of the registration area, or a relay mode that is authorized on the basis of the RAT.

In an example, the relay mode which can be provided by the relay device includes at least one of the following: a relay mode that is supported by the relay device, a relay mode that is authorized by the relay device, or a relay mode which is able to be provided by a network device corresponding to the relay device.

In an example, the relay mode that is supported by the relay device includes at least one of the following: a relay mode that is supported on the basis of the PLMN, a relay mode that is supported on the basis of the registration area, or a relay mode that is supported on the basis of the RAT.

In an example, the relay mode that is authorized by the relay device includes at least one of the following: a relay mode that is authorized on the basis of the PLMN, a relay mode that is authorized on the basis of a registration area, or a relay mode that is authorized on the basis of the RAT.

In an example, the network device corresponding to the relay device includes at least one of the following: a resident network device for the relay device, or a register network device for the relay device.

In an example, the network device corresponding to the relay device includes the resident network device for the relay device. A relay mode which can be provided by the resident network device for the relay device is carried in a system message that is announced by the resident network device for the relay device.

In an example, the network device corresponding to the relay device includes the register network device for the relay device; and a relay mode which can be provided by the register network device for the relay device is carried in a registration message that is sent by the register network device for the relay device.

In an example, the relay mode which can be provided by the relay device is carried in a first message. The first message is a discovery message or a response message for a relay solicitation message sent by the remote device.

In an example, the relay mode which can be provided by the relay device corresponds to at least one piece of the following reference information: the PLMN, the RAT, the RSC, the DNN, or the network slice.

Figure 18:
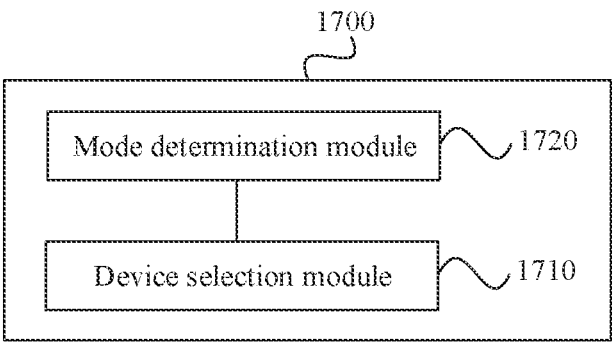
FIG. 18 is a block diagram of an apparatus for selecting a relay device according to another embodiment of the present application.

In an example, the at least one piece of the reference information is carried in the first message. The first message is a discovery message or a response message for a relay solicitation message sent by the remote device. As shown in FIG. 18, the apparatus 1700 further includes: a mode determination module 1720, configured to, determine, according to the at least one piece of the reference information and a first correspondence, the relay mode which can be provided by the relay device. The first correspondence includes a correspondence between at least one piece of the reference information and a relay mode which can be provided by the relay device.

In an example, the first correspondence is pre-configured in the remote device.

In an example, the type of the relay mode includes at least one of the following: a layer 3-based relay mode, a layer 2-based relay mode, and an N3IWF-based relay mode.

In conclusion, according to the technical solutions provided in the embodiments of the present application, in a process of a remote device discovering a relay device, a message from the relay device to the remote device is set to indicate a relay mode which can be provided by the relay device, so that the remote device can select a suitable relay device from among at least one relay device according to relay modes which can be provided by the at least one relay device and a relay mode to which the remote device can adapt, so as to implement relay communication. Since a relay mode which can be provided by the suitable relay device matches the relay mode to which the remote device can adapt, unable relay communication due to the mismatch of the relay modes can be avoided, so that a relay communication process can be efficiently and stably realized. In addition, according to the embodiments of the present application, the relay device can be selected according to the relay mode which can be provided by the relay device and the relay mode to which the remote device can adapt. Therefore, the relay capabilities of different devices are taken into full consideration, and a selection mechanism of the relay device can be further improved.

Figure 19:
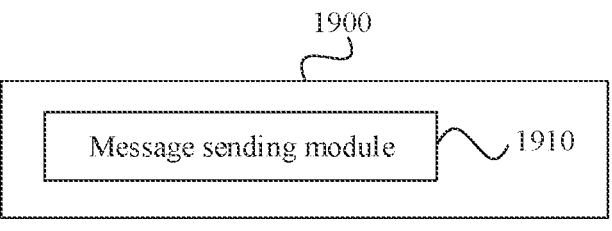
FIG. 19 is a block diagram of an apparatus for selecting a relay device according to still another embodiment of the present application.

FIG. 19 is a block diagram of an apparatus for selecting a relay device according to an embodiment of the present application. The apparatus has the function of implementing the above method examples on the relay device side, and the function may be implemented by means of hardware or by means of hardware executing corresponding software. The apparatus may be the relay device introduced above, or may be disposed in the relay device. As shown in FIG. 19, the apparatus 1900 may include a message sending module 1910.

The message sending module 1910 is configured to send a first message to a remote device. The first message is used to indicate a relay mode which can be provided by the relay device. The first message is a discovery message or a response message for a relay solicitation message sent by the remote device.

In an example, the relay mode which can be provided by the relay device includes at least one of the following: a relay mode that is supported by the relay device, a relay mode that is authorized by the relay device, or a relay mode which is able to be provided by a network device corresponding to the relay device.

In an example, the relay mode that is supported by the relay device includes at least one of the following: a relay mode that is supported on the basis of a PLMN, a relay mode that is supported on the basis of a registration area, or a relay mode that is supported on the basis of an RAT.

In an example, the relay mode that is authorized by the relay device includes at least one of the following: a relay mode that is authorized on the basis of the PLMN, a relay mode that is authorized on the basis of the registration area, or a relay mode that is authorized on the basis of the RAT.

In an example, the network device corresponding to the relay device includes at least one of the following: a resident network device for the relay device, or a register network device for the relay device.

In an example, the network device corresponding to the relay device includes the resident network device for the relay device. A relay mode which can be provided by the resident network device for the relay device is carried in a system message that is announced by the resident network device for the relay device.

In an example, the network device corresponding to the relay device includes the register network device for the relay device; and a relay mode which can be provided by the register network device for the relay device is carried in a registration message that is sent by the register network device for the relay device.

In an example, the first message includes the relay mode which can be provided by the relay device.

In an example, the relay mode which can be provided by the relay device corresponds to at least one piece of the following reference information: the PLMN, the RAT, the RSC, the DNN, or the network slice.

In an example, the first message includes at least one piece of reference information.

In an example, a type of the relay mode includes at least one of the following: a layer 3-based relay mode, a layer 2-based relay mode, and an N3IWF-based relay mode.

In conclusion, according to the technical solutions provided in the embodiments of the present application, in a process of a remote device discovering a relay device, a message from the relay device to the remote device is set to indicate a relay mode which can be provided by the relay device, so that the remote device can select a suitable relay device from among at least one relay device according to relay modes which can be provided by the at least one relay device and the relay mode to which the remote device can adapt, so as to implement relay communication. Since the relay mode which can be provided by the suitable relay device matches the relay mode to which the remote device can adapt, unable relay communication due to the mismatch of the relay modes can be avoided, so that a relay communication process can be efficiently and stably realized. In addition, according to the embodiments of the present application, the relay device can be selected according to the relay mode which can be provided by the relay device and the relay mode to which the remote device can adapt. Therefore, the relay capabilities of different devices are taken into full consideration, and a selection mechanism of the relay device can be further improved.

It is to be noted that, when the apparatus provided in the above embodiment implements functions of the apparatus, only the division of the above functional modules is used as an example for description. In practical applications, the above function can be allocated to and performed by different function modules according to actual requirements. That is to say, a content structure of the device is divided into different function modules, so as to perform all or part of the functions described above.

For the apparatus in the above embodiments, the specific manner in which each module performs operations has been described in detail in the embodiments of the method, and details are not described herein again.

Figure 20:
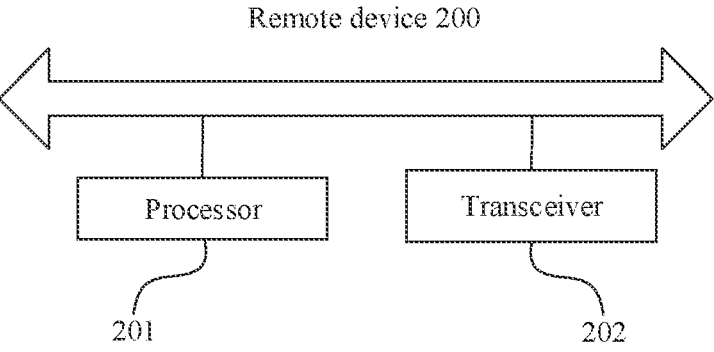
FIG. 20 is a schematic structural diagram of a remote device according to an embodiment of the present application.

FIG. 20 is a schematic structural diagram of a remote device 200 according to an embodiment of the present application. For example, the remote device may be configured to execute the method for selecting the relay device at the remote device side. Specifically, the remote device 200 may include a processor 201 and a transceiver 202 connected to the processor 201.

The processor 201 includes one or more processing cores. The processor 201 executes function applications and information processing by operating software programs and modules.

The transceiver 202 includes a receiver and a transmitter. Optionally, the transceiver 202 is a communication chip.

In an example, the remote device 200 further includes a memory and a bus. The memory is connected to the processor via the bus. The memory may be configured to store a computer program. The processor is configured to execute the computer program, so as to implement steps in the above method embodiments that are executed by the remote device.

In addition, the memory may be implemented by any type of volatile or non-volatile storage device or a combination thereof. The volatile or non-volatile storage device includes, but is not limited to, a Random-Access Memory (RAM), a Read-Only Memory (ROM), an Erasable Programmable Read-Only Memory (EPROM), an Electrically Erasable Programmable Read-Only Memory (EEPROM), a flash memory or other solid state storage technologies, a Compact Disc Read-Only Memory (CD-ROM), a Digital Video Disc (DVD), or other optical storage, tape cartridges, magnetic tape, disk storage or other magnetic storage devices.

The processor 201 is configured to select a first relay device from among at least one relay device on the basis of a relay mode to which the remote device can adapt and a relay mode which can be provided by the at least one relay device. The first relay device is used for implementing a communication between the remote device and a network device. A relay mode which can be provided by the first relay device matches the relay mode to which the remote device can adapt.

In an example, the relay mode which can be provided by the first relay device matches the relay mode to which the remote device can adapt in a manner including any one of the following: the relay mode which can be provided by the first relay device is the same as the relay mode to which the remote device can adapt; the relay mode which can be provided by the first relay device includes the relay mode to which the remote device can adapt; and the relay mode to which the remote device can adapt includes the relay mode which can be provided by the first relay device.

In an example, the relay mode to which the remote device can adapt includes at least one of the following: a relay mode that is supported by the remote device, or a relay mode that is authorized by the remote device.

In an example, the relay mode that is supported by the remote device includes at least one of the following: a relay mode that is supported on the basis of the PLMN, a relay mode that is supported on the basis of a registration area, or a relay mode that is supported on the basis of the RAT.

In an example, the relay mode that is authorized by the remote device includes at least one of the following: a relay mode that is authorized on the basis of the PLMN, a relay mode that is authorized on the basis of the registration area, or a relay mode that is authorized on the basis of the RAT.

In an example, the relay mode which can be provided by the relay device includes at least one of the following: a relay mode that is supported by the relay device, a relay mode that is authorized by the relay device, or a relay mode which is able to be provided by a network device corresponding to the relay device.

In an example, the relay mode that is supported by the relay device includes at least one of the following: a relay mode that is supported on the basis of the PLMN, a relay mode that is supported on the basis of the registration area, or a relay mode that is supported on the basis of the RAT.

In an example, the relay mode that is authorized by the relay device includes at least one of the following: a relay mode that is authorized on the basis of the PLMN, a relay mode that is authorized on the basis of the registration area, or a relay mode that is authorized on the basis of the RAT.

In an example, the network device corresponding to the relay device includes at least one of the following: a resident network device for the relay device, or a register network device for the relay device.

In an example, the network device corresponding to the relay device includes the resident network device for the relay device. A relay mode which can be provided by the resident network device for the relay device is carried in a system message that is announced by the resident network device for the relay device.

In an example, the network device corresponding to the relay device includes the register network device for the relay device; and a relay mode which can be provided by the register network device for the relay device is carried in a registration message that is sent by the register network device for the relay device.

In an example, the relay mode which can be provided by the relay device is carried in a first message. The first message is a discovery message or a response message for a relay solicitation message sent by the remote device.

In an example, the relay mode which can be provided by the relay device corresponds to at least one piece of the following reference information: the PLMN, the RAT, the RSC, the DNN, or the network slice.

In an example, the at least one piece of the reference information is carried in the first message. The first message is a discovery message or a response message for a relay solicitation message sent by the remote device. The processor 201 is configured to determine, according to the at least one piece of the reference information and a first correspondence, the relay mode which can be provided by the relay device. The first correspondence includes a correspondence between at least one piece of the reference information and a relay mode which can be provided by the relay device.

In an example, the first correspondence is pre-configured in the remote device.

In an example, the type of the relay mode includes at least one of the following: a layer 3-based relay mode, a layer 2-based relay mode, and an N3IWF-based relay mode.

Figure 21:
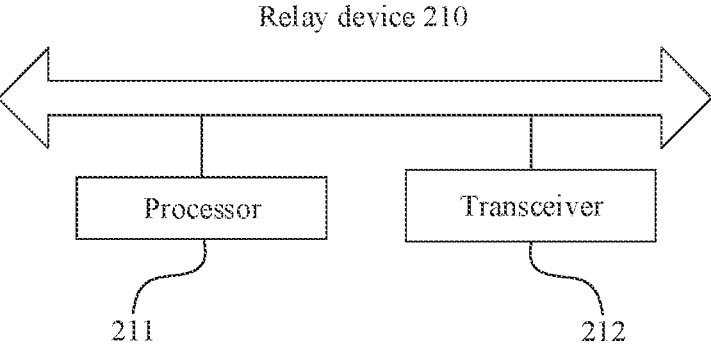
FIG. 21 is a schematic structural diagram of a relay device according to an embodiment of the present application.

FIG. 21 is a schematic structural diagram of a relay device 210 according to an embodiment of the present application. For example, the relay device may be configured to execute the method for selecting the relay device at the relay device side. Specifically, the relay device 210 may include a processor 211 and a transceiver 212 connected to the processor 211.

The processor 211 includes one or more processing cores. The processor 211 executes function applications and information processing by operating software programs and modules.

The transceiver 212 includes a receiver and a transmitter. Optionally, the transceiver 212 is a communication chip.

In an example, the relay device 210 further includes a memory and a bus. The memory is connected to the processor via the bus. The memory may be configured to store a computer program. The processor is configured to execute the computer program, so as to implement steps in the above method embodiments that are executed by the relay device.

In addition, the memory may be implemented by any type of volatile or non-volatile storage device or a combination thereof. The volatile or non-volatile storage device includes, but is not limited to, a Random-Access Memory (RAM), a Read-Only Memory (ROM), an Erasable Programmable Read-Only Memory (EPROM), an Electrically Erasable Programmable Read-Only Memory (EEPROM), a flash memory or other solid state storage technologies, a Compact Disc Read-Only Memory (CD-ROM), a Digital Video Disc (DVD), or other optical storage, tape cartridges, magnetic tape, disk storage or other magnetic storage devices.

The transceiver 212 is configured to send a first message to a remote device. The first message is used to indicate a relay mode which can be provided by the relay device. The first message is a discovery message or a response message for a relay solicitation message sent by the remote device.

In an example, the relay mode which can be provided by the relay device includes at least one of the following: a relay mode that is supported by the relay device, a relay mode that is authorized by the relay device, or a relay mode which is able to be provided by a network device corresponding to the relay device.

In an example, the relay mode that is supported by the relay device includes at least one of the following: a relay mode that is supported on the basis of a PLMN, a relay mode that is supported on the basis of a registration area, or a relay mode that is supported on the basis of an RAT.

In an example, the relay mode that is authorized by the relay device includes at least one of the following: a relay mode that is authorized on the basis of the PLMN, a relay mode that is authorized on the basis of the registration area, or a relay mode that is authorized on the basis of the RAT.

In an example, the network device corresponding to the relay device includes at least one of the following: a resident network device for the relay device, or a register network device for the relay device.

In an example, the network device corresponding to the relay device includes the resident network device for the relay device. A relay mode which can be provided by the resident network device for the relay device is carried in a system message that is announced by the resident network device for the relay device.

In an example, the network device corresponding to the relay device includes the register network device for the relay device; and a relay mode which can be provided by the register network device for the relay device is carried in a registration message that is sent by the register network device for the relay device.

In an example, the first message includes the relay mode which can be provided by the relay device.

In an example, the relay mode which can be provided by the relay device corresponds to at least one piece of the following reference information: the PLMN, the RAT, an RSC, a DNN, or the network slice.

In an example, the first message includes at least one piece of reference information.

In an example, the type of the relay mode includes at least one of the following: a layer 3-based relay mode, a layer 2-based relay mode, and an N3IWF-based relay mode.

An embodiment of the present application provides a computer-readable storage medium. The storage medium stores a computer program. The computer program is executed by a processor of a remote device, so as to implement the method for selecting the relay device at the remote device side as described above.

An embodiment of the present application further provides a computer-readable storage medium. The storage medium stores a computer program. The computer program is executed by a processor of a relay device, so as to implement the method for selecting the relay device at the relay device side as described above.

An embodiment of the present application further provides a chip. The storage medium stores a computer program. The computer program is executed by a processor of a relay device, so as to implement the method for selecting the relay device on the relay device side as described above.

An embodiment of the present application further provides a chip. The chip includes a programmable logic circuit and/or a program instruction. When the chip is operated on a relay device, the method for selecting the relay device at the relay device side as described above is implemented.

An embodiment of the present application further provides a computer program product. When the computer program product is operated on a remote device, the method for selecting the relay device at the remote device side as described above is implemented.

An embodiment of the present application further provides a computer program product. When the computer program product is operated on a relay device, the method for selecting the relay device at the relay device side as described above is implemented.

The technical solutions provided by the embodiments of the present application may include the following beneficial effects.

In a process of the remote device discovering the relay device, a message from the relay device to the remote device is set to indicate a relay mode which can be provided by the relay device, so that the remote device can select a suitable relay device from among the at least one relay device according to relay modes which can be provided by the at least one relay device and the relay mode to which the remote device can adapt, so as to implement relay communication. Since the relay mode which can be provided by the suitable relay device matches the relay mode to which the remote device can adapt, unable relay communication due to the mismatch of the relay modes can be avoided, so that a relay communication process can be efficiently and stably realized. In addition, according to the embodiments of the present application, the relay device can be selected according to the relay mode which can be provided by the relay device and the relay mode to which the remote device can adapt. Therefore, the relay capabilities of different devices are taken into full consideration, and a selection mechanism of the relay device can be further improved.

Those skilled in the art should note that, in one or more of the above examples, functions described in the embodiments of the present invention may be implemented by means of hardware, software, firmware, or any combination thereof. When the software is applied, these functions may be stored in the computer-readable medium or transmitted as one or more instructions or codes on the computer-readable medium. The computer-readable medium includes a computer storage medium and a communication medium. The communication medium includes any media transmitting a computer program from one place to another place. The storage medium may be any available media capable of being stored by a general or special computer.

The above are only exemplary embodiments of the present application, and are not used to limit the present application. Any modifications, equivalent replacements and improvements and the like made within the spirit and principle of the disclosure shall be included within the scope of protection of the disclosure.

The invention claimed is:

1. A method for selecting a relay device, applied to a remote device and comprising:

selecting a first relay device from among at least one relay device on a basis of at least one relay mode to which the remote device is able to adapt and at least one relay mode which is able to be provided by the at least one relay device, wherein the first relay device is used for implementing a communication between the remote device and a network device, and at least one relay mode which is able to be provided by the first relay device matches the at least one relay mode to which the remote device is able to adapt, and the at least one relay mode which is able to be provided by the at least one relay device corresponds to a piece of reference information comprising a Relay Service Code (RSC), wherein the method further comprises:

determining, according to the piece of reference information and a first correspondence, the at least one relay mode which is able to be provided by the at least one relay device, wherein the first correspondence comprises a correspondence between at least one piece of reference information and at least one relay mode which is able to be provided by a relay device, and the at least one relay mode which is able to be provided by the at least one relay device comprises a relay mode based on a Non-3rd Generation Partnership Project (3GPP) Inter Working Function (N3IWF).

2. The method of claim 1, wherein the at least one relay mode to which the remote device is able to adapt comprises at least one of:

at least one relay mode that is supported by the remote device; or at least one relay mode that is authorized by the remote device.

3. The method of claim 1, wherein the at least one relay mode which is able to be provided by the at least one relay device comprises at least one of:

at least one relay mode that is supported by the at least one relay device;

at least one relay mode that is authorized by the at least one relay device; or at least one relay mode which is able to be provided by a network device corresponding to the at least one relay device.

4. The method of claim 1, wherein the reference information further comprises at least one of:

a Public Land Mobile Network (PLMN);

a Radio Access Technology (RAT);

a Data Network Name (DNN); or a network slice.

5. The method of claim 1, wherein the at least one piece of the reference information is carried in a first message, and the first message is a discovery message or a response message for a relay solicitation message sent by the remote device.

6. The method of claim 1, wherein the first correspondence is pre-configured in the remote device.

7. The method of claim 1, wherein the at least one relay mode which is able to be provided by the at least one relay device further comprises at least one of:

a layer 3-based relay mode, or a layer 2-based relay mode.

8. A method for selecting a relay device, applied to a relay device and comprising:

sending a first message to a remote device, wherein the first message is used to indicate at least one relay mode which is able to be provided by the relay device, the at least one relay mode which is able to be provided by the relay device corresponds to a piece of reference information comprising a Relay Service Code (RSC), the piece of reference information is carried in the first message, and is used for the remote device to determine the at least one relay mode which is able to be provided by the relay device based on the piece of reference information and a first correspondence, and wherein the at least one relay mode which is able to be provided by the relay device comprises a relay mode based on a Non-3rd Generation Partnership Project (3GPP) Inter Working Function (N3IWF), and the first message is a discovery message or a response message for a relay solicitation message sent by the remote device.

9. The method of claim 8, wherein the at least one relay mode which is able to be provided by the relay device comprises at least one of:

at least one relay mode that is supported by the relay device;

at least one relay mode that is authorized by the relay device; or at least one relay mode which is able to be provided by a network device corresponding to the relay device.

10. The method of claim 8, wherein the reference information further comprises at least one of:

a Public Land Mobile Network (PLMN);

a Radio Access Technology (RAT);

a Data Network Name (DNN); or a network slice.

11. The method of claim 8, wherein the at least one relay mode which is able to be provided by the relay device further comprises at least one of:

a layer 3-based relay mode; or a layer 2-based relay mode.

12. A remote device, comprising:

a processor; and a transceiver connected to the processor, wherein the processor is configured to select a first relay device from among at least one relay device on a basis of at least one relay mode to which the remote device is able to adapt and at least one relay mode which is able to be provided by the at least one relay device, wherein the first relay device is used for implementing a communication between the remote device and a network device, and at least one relay mode which is able to be provided by the first relay device matches the at least one relay mode to which the remote device is able to adapt, and the at least one relay mode which is able to be provided by the at least one relay device corresponds to a piece of reference information comprising a Relay Service Code (RSC), and the processor is further configured to:

determine, according to the piece of reference information and a first correspondence, the at least one relay mode which is able to be provided by the at least one relay device, wherein the first correspondence comprises a correspondence between at least one piece of reference information and at least one relay mode which is able to be provided by a relay device, and the at least one relay mode which is able to be provided by the at least one relay device comprises a relay mode based on a Non-3rd Generation Partnership Project (3GPP) Inter Working Function (N3IWF).

13. The remote device of claim 12, wherein the reference information further comprises at least one of:

a Public Land Mobile Network (PLMN);

a Radio Access Technology (RAT);

a Data Network Name (DNN); or a network slice.

14. The remote device of claim 12, wherein the at least one piece of the reference information is carried in a first message, the first message is a discovery message or a response message for a relay solicitation message sent by the remote device.

15. The remote device of claim 12, wherein the first correspondence is pre-configured in the remote device.

16. A relay device, comprising:

a processor; and a transceiver connected to the processor, wherein the transceiver is configured to send a first message to a remote device, wherein the first message is used to indicate at least one relay mode which is able to be provided by the relay device, the at least one relay mode which is able to be provided by the relay device corresponds to a piece of reference information comprising a Relay Service Code (RSC), the piece of reference information is carried in the first message, and is used for the remote device to determine the at least one relay mode which is able to be provided by the relay device based on the piece of reference information and a first correspondence, and wherein the at least one relay mode which is able to be provided by the relay device comprises a relay mode based on a Non- 3rd Generation Partnership Project (3GPP) Inter Working Function (N3IWF), and the first message is a discovery message or a response message for a relay solicitation message sent by the remote device.

17. The relay device of claim 16, wherein the at least one relay mode which is able to be provided by the relay device comprises at least one of:

at least one relay mode that is supported by the relay device;

at least one relay mode that is authorized by the relay device, or at least one relay mode which is able to be provided by a network device corresponding to the relay device.

18. The relay device of claim 16, wherein the reference information further comprises at least one of:

a Public Land Mobile Network (PLMN);

a Radio Access Technology (RAT);

a Data Network Name (DNN); or a network slice.

\* \* \* \* \*